United States Patent
Burch

[19]

[11] Patent Number: 5,316,181
[45] Date of Patent: May 31, 1994

[54] LIQUID DISPENSING SYSTEM

[75] Inventor: Daniel E. Burch, Lewisville, Tex.

[73] Assignee: Integrated Designs, Inc., Dallas, Tex.

[21] Appl. No.: 47,046

[22] Filed: Apr. 12, 1993

Related U.S. Application Data

[63] Continuation of Ser. No. 860,197, Mar. 26, 1992, abandoned, which is a continuation of Ser. No. 483,264, Jan. 29, 1990, abandoned.

[51] Int. Cl.⁵ .............................................. B67D 5/54
[52] U.S. Cl. ........................................ 222/61; 222/1; 222/56; 222/144.5; 222/399
[58] Field of Search ............. 222/1, 52, 56, 61, 63-68, 222/136, 144.5, 145, 394, 399, 642

[56] References Cited

U.S. PATENT DOCUMENTS

| | | | |
|---|---|---|---|
| 1,459,962 | 6/1923 | Wheeler | 137/205 |
| 2,294,798 | 9/1942 | Nelson | 103/6 |
| 3,051,192 | 8/1962 | Fagot et al. | 137/391 |
| 4,106,671 | 8/1978 | Sharples | 222/61 |
| 4,247,018 | 1/1981 | Credle | 222/1 |
| 4,305,527 | 12/1981 | McMillin et al. | 222/1 |
| 4,377,246 | 3/1983 | McMillin et al. | 222/56 |
| 4,412,568 | 11/1983 | Hughes | 141/392 |
| 4,440,315 | 4/1984 | Slobodnik | 222/56 |
| 4,450,981 | 5/1984 | Haig | 222/61 |
| 4,483,665 | 11/1984 | Hauser | 417/401 |
| 4,493,435 | 1/1985 | Hartley | 222/52 |
| 4,560,089 | 12/1985 | McMillin et al. | 222/14 |
| 4,561,566 | 12/1985 | Slobodnik | 222/56 |
| 4,601,409 | 7/1986 | DiRegolo | 222/1 |
| 4,967,811 | 11/1990 | DiGianfilippo et al. | 141/83 |

FOREIGN PATENT DOCUMENTS 2620117 11/1977 Fed. Rep. of Germany.

Primary Examiner—Michael S. Huppert
Assistant Examiner—Janice Krizek
Attorney, Agent, or Firm—Hubbard, Tucker & Harris

[57] ABSTRACT

A liquid dispensing system, comprising a liquid filled reservoir, a control microprocessor, and a plurality of outlets connected to the reservoir. A filter may be provided between the reservoir and the outlets for filtering the liquid. A valve provided with each outlet controls flow through the outlet. Each valve is individually controlled by the processor so that each outlet can be selected individually. The processor is adapted to receive a signal signifying a demand for liquid from a particular outlet. On reception of the demand, a selected valve is opened responsive to a signal from the processor while other valves remain closed, allowing liquid dispensing through only the selected outlet. An orifice included with each outlet and a predetermined pressure applied to the liquid sensed adjacent the selected outlet controls the rate of flow through the selected outlet. The controller provides a signal to the selected valve at the end of a predetermined time period to close the valve. The time period together with the rate of flow allows a specific amount of liquid to be dispensed. A plurality of inlets connect with the reservoir. Each inlet is connected to a separate liquid supply. When a low liquid level is sensed in the reservoir and dispensing is not in process, an inlet is selected, opened and the reservoir is filled. When the processor detects that the reservoir is not filled after a predetermined time, another inlet is selected, opened and the reservoir continues filling until a predetermined level is reached.

90 Claims, 16 Drawing Sheets

LIQUID DISPENSING SYSTEM

This application is a continuation of application Ser. No. 07/860,197, filed Mar. 26, 1992, now abandoned which is a continuation of application Ser. No. 07/483,264, filed Jan. 29, 1990, abandoned.

BACKGROUND OF THE INVENTION

The present invention relates generally to a system for dispensing liquids, and, more particularly, to an automatic microprocessor controlled system for dispensing a specific amount of liquid to a piece of processing equipment adapted for receiving a specific amount of liquid from the system, and which system automatically switches between a plurality of liquid supply sources that furnish liquid to the system for dispensing when one of the liquid sources is detected as empty.

For certain manufacturing processes it is imperative to carefully regulate the operating conditions of the various processes. One problem encountered in certain manufacturing processes such as those dispensing liquid photoresist chemicals is discontinuities formed in photoresist layers due to air bubbles that are introduced into the process as the liquid photoresist is dispensed. The liquid photoresist chemicals are furnished in relatively small bottles, and it is necessary to replenish the chemicals as they are emptied.

It is known to use pumping as described in U.S. Pat. No. 4,601,409 to create a reduced pressure within a reservoir by pumping liquid from the reservoir to dispense liquid chemicals which concurrently draws liquid from a container into the reservoir to keep the reservoir filled above a pre-set level. From this disclosure, it is also known to switch from one container to another when one container becomes empty, thus allowing filling of the reservoir to continue. However, this is not entirely satisfactory because both filling and dispensing operations are active at the same time. Consequently, if the reservoir cannot be filled at least at the same rate that liquid is being dispensed due to empty inlets, other fluid blockage or other reasons, there is a possibility of gaseous fluid being dispensed along with or in lieu of the liquid chemicals.

Second, the prior pumping arrangement is conventionally provided by a bellows type pump. However, this is not entirely satisfactory because the flow rate is not steady. Consequently, it is difficult to dispense a specific amount of liquid chemicals. Further, with this type of pumping arrangement, if a filter were included with the system, it would be difficult to compensate for the increasing pressure drop across the filter as the filter becomes loaded with contaminants over the passage of time.

SUMMARY OF THE INVENTION

Therefore, the liquid dispensing system according to the present invention dispenses liquid chemicals in accurate and repeatable amounts while isolating filling or replenishing operations from dispensing operations in order to prevent gaseous fluid from being dispensed along with the liquid chemicals. The system according to the present invention comprises a liquid filler reservoir, a control microprocessor, and a plurality of outlets connected to the reservoir, each outlet being connected to a piece of process equipment adapted to receive a specific amount of liquid fluid from the outlet. The control microprocessor is driven by suitable software according to algorithms of the present invention. The parameters for various modes of the system are programmed into the controller by the user. An outlet valve provided with each outlet controls flow through the outlet. Each outlet valve is individually controlled by the processor so that each outlet can be selected individually. The system is user friendly and gives the user complete control of the dispensing needs.

The processor is adapted to receive a signal from a piece of process equipment connected to a particular outlet signifying a demand for a specific amount of liquid from the particular outlet. On reception of the demand, the system switches to a dispense mode, and a pressure regulator responsive to a signal from the processor applies pressure to the liquid in the reservoir. When the pressure applied has reached a predetermined value as represented by a pressure sensed adjacent the particular outlet, a particular outlet valve controlling that outlet is selected and opened responsive to a signal from the processor while other outlet valves remain closed, allowing liquid to be dispensed through only the selected outlet to the equipment.

An orifice included with each outlet and the predetermined pressure applied to the liquid sensed adjacent the selected outlet controls the rate of liquid flow through the selected outlet. The controller provides a signal to the selected outlet valve at the end of a predetermined time period to close the valve. The time period together with the rate of flow allows a specific amount of liquid to be dispensed to the equipment. A servo loop between a pressure sensor and a pressure regulator through the microprocessor allows for a stable dispense regardless of the number of outlet valves that are open. Because the pressure is sensed by the pressure sensor adjacent the outlets, more than one outlet may be open at any time, allowing liquid chemicals to be dispensed to more than one piece of process equipment.

After the specific amount of liquid has been dispensed to the equipment, the selected outlet valve is closed and the system switches to an optional outgas mode. A vacuum venturi is activated via a signal from the controller to remove the pressure acting on the liquid in the reservoir, thus allowing the liquid to be in its own environment. A check valve between the reservoir and the vacuum venturi prevents venturi activation pressure provided by compressed air or nitrogen gas from back flowing into the reservoir. If the optional outgas mode is not selected the normal mode is active. In this mode, the vacuum venturi is not activated, but the reservoir is allowed to vent through the venturi to atmospheric pressure.

In order to keep the reservoir filled with liquid chemicals, a plurality of inlets connect with the reservoir. Each inlet is connected to a separate liquid supply. When a low liquid level is sensed in the reservoir, and dispensing is not in progress, the system switches to a fill mode, and an inlet responsive to a signal from the controller is selected, opened, and the reservoir is filled to a predetermined level. Should the reservoir fall below the low liquid level during dispensing a known reserve amount or volume in the reservoir below the low liquid level but above the reservoir outlet or filter, if present, provides further liquid for dispensing a known number of dispenses called the empty count and prevents gaseous fluid from being dispensed until the required amount of liquid is dispensed.

When the processor detects that the reservoir is not filled after a predetermined time has elapsed, another inlet responsive to another signal from the controller is selected, opened, and the reservoir continues filling until the predetermined level is reached. The inlet that has been detected by the controller as having an empty liquid supply is assigned an empty status by the controller. The empty status is used by the controller to identify the inlet as empty so that the empty inlet is not again selected when the fill mode is again activated.

While the reservoir is being replenished and the empty count for the reservoir has not exceeded its maximum value, the system may again switch to the dispense mode and re-select the outlets that were temporarily closed for the fill mode and continue to deliver liquid through the selected outlets until the specific amount of liquid has been delivered to the process equipment. After dispensing, the system will again switch back to the refill mode if necessary and continue filling. A liquid supply alarm which may be visual or audible notifies the operator which liquid supply is empty, allowing the operator to refill or replace the empty liquid supply.

A preferred way to fill the reservoir with liquid is by applying a vacuum to the isolated reservoir while the selected inlet is open by activating the vacuum venturi via a signal from the controller. The reduced pressure draws liquid from the liquid supply through the inlet into the reservoir. Another preferred way to fill the reservoir with liquid is by applying gaseous pressure to the selected liquid supply to act against the liquid therein, causing liquid to flow through the selected inlet into the reservoir.

In the event that the high liquid level sensor fails, a liquid overflow sensor located adjacent an exhaust interlock between the reservoir and the vacuum venturi detects any liquid overflow present at the interlock and sends a signal to the processor. On reception of the signal indicating liquid overflow in the processor, the selected inlet is closed via a signal from the microprocessor, halting further liquid flow into the reservoir.

When a demand for liquid is received during the fill mode and the liquid level of the reservoir is above the low liquid level, the fill mode is terminated. The selected inlet responsive to a signal from the computer is closed and the system switches to the dispensing mode.

A filter may be provided between the reservoir and the outlets for filtering the liquid during the dispense mode. Consequently, the pressure sensed adjacent the selected outlet during the dispense mode is downstream between the filter and the outlets. During the dispense mode, the system senses the pressure drop across the filter and provides a signal indicative of the pressure drop to the microprocessor. Because pressure applied to the liquid in the reservoir is increased as the pressure sensed adjacent the selected outlet decreases as the filter becomes loaded with contaminants, the pressure sensed adjacent the selected outlet can be maintained at a predetermined pressure. The microprocessor receives the signal and converts the signal into a usable value that is compared to a predetermined value for the pressure drop. When the value converted from the signal received is greater than the predetermined value, the processor communicates a warning signal to the operator. Therefore, when the value converted from the signal received is greater than the predetermined value, the processor activates a filter alarm which may be audible or visual signifying that the filter condition is unsatisfactory.

The above and other features of the present invention will become apparent from the drawings, the description given herein, and the appended claims.

BRIEF DESCRIPTION OF THE DRAWINGS

The invention may be more fully understood by reference to the following description of the preferred embodiment in conjunction with the drawings and wherein.

DETAILED DESCRIPTION

Figure 1:
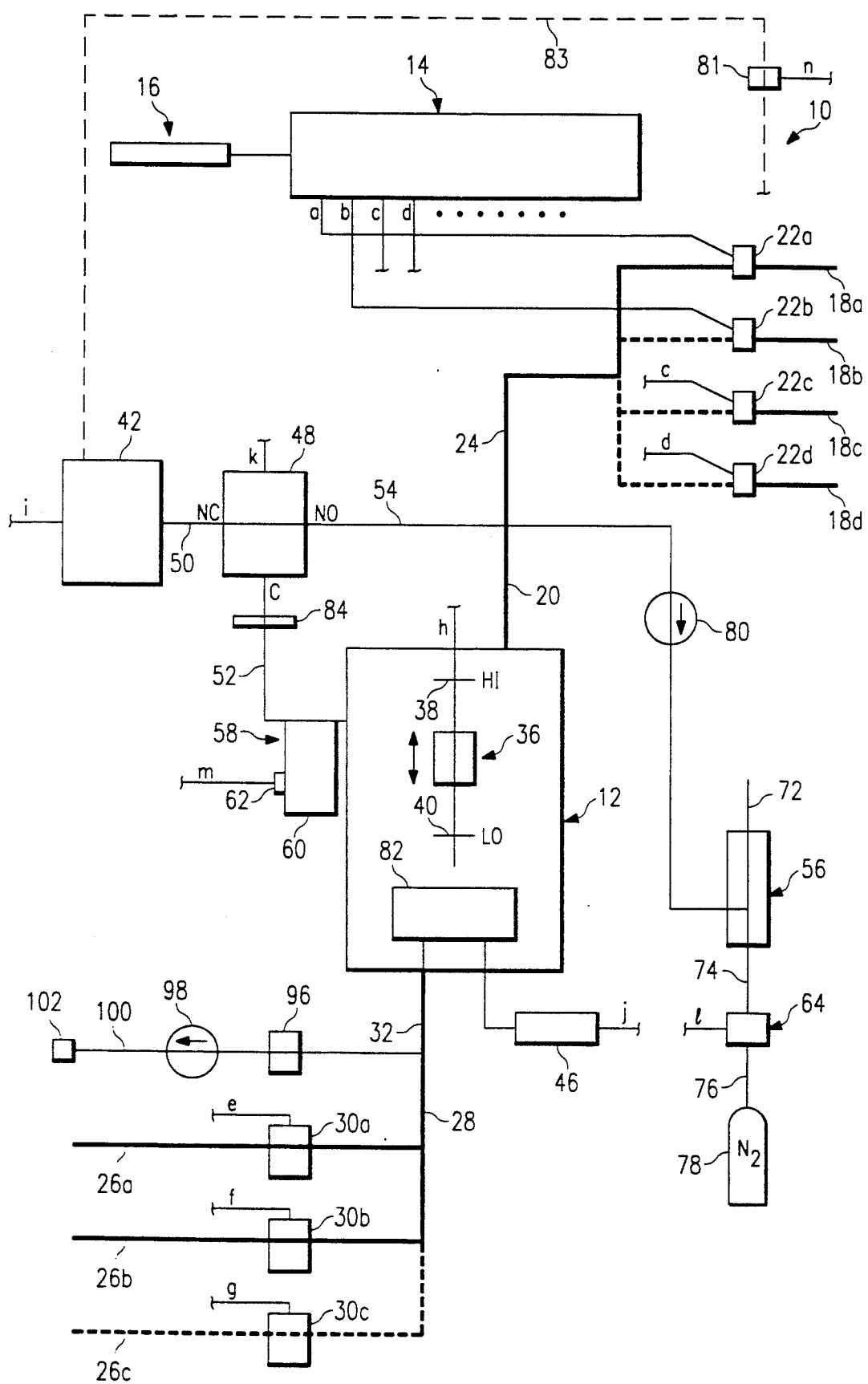
FIG. 1 is a schematic view of the preferred embodiment of the liquid dispensing system of the present invention.

Referring to FIG. 1, a schematic representation of the liquid dispensing system 10 of the present invention is shown. System 10 dispenses liquid fluids in accurate and repeatable amounts, and can be made compatible with all different types of acids, solvents and bases. At the center of system 10 is a pressurable chemical reservoir 12. Reservoir 12 is a closed vessel capable of containing a substantial quantity of liquid fluid that is suitable for pressurization for purposes as described hereafter.

Figure 3:
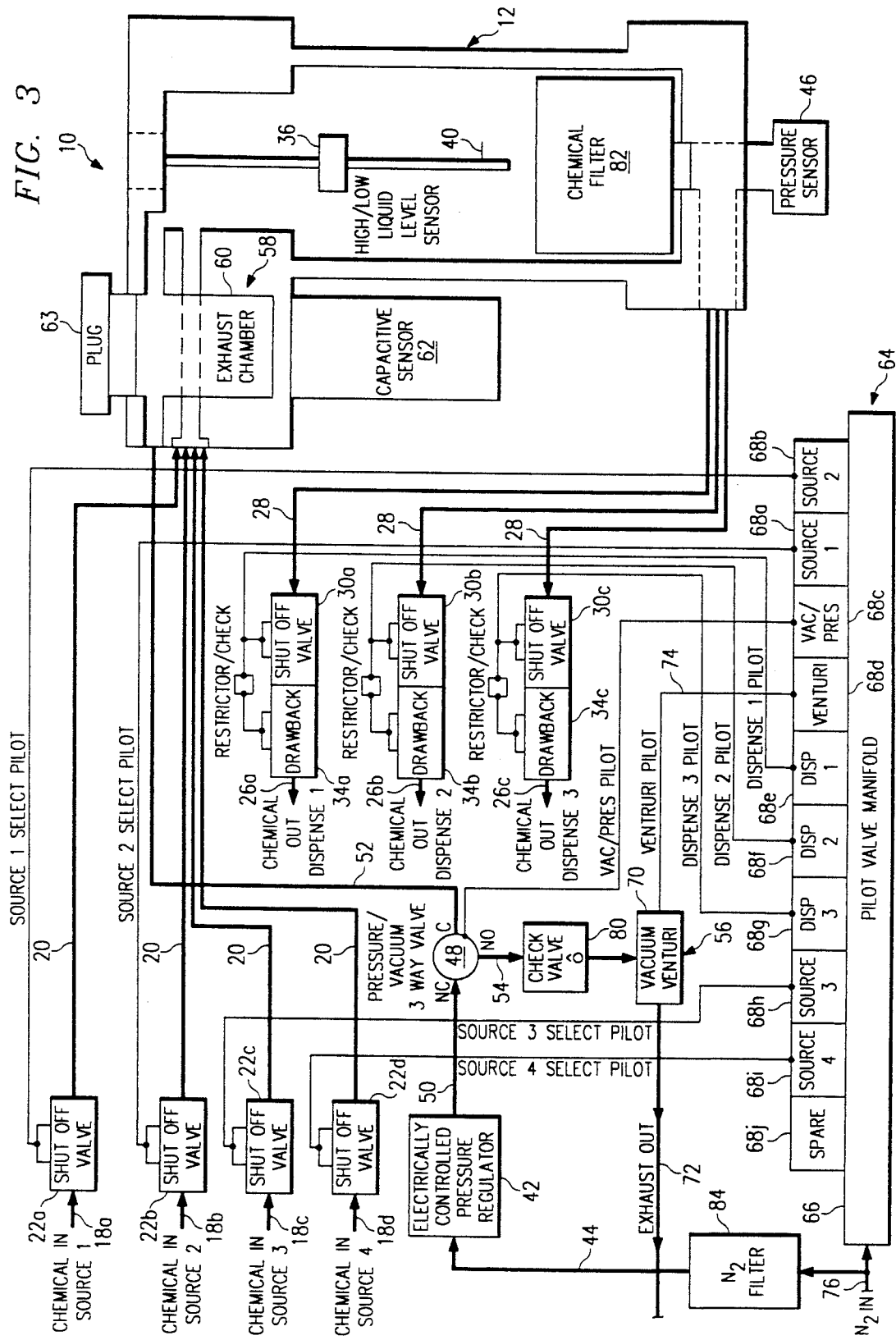
FIGS. 3 is a third schematic view of the liquid dispensing system of FIG. 1.

A software driven dispense system controller 14 programmed according to the algorhythms of FIGS. 4–34 controls the operation of system 10. A keyboard 16 connected to controller 14 allows the user to selectively program the microprocessor of controller 14 to manage the operation of system 10. Controller 14 includes a suitable microprocessor such as a Zilog Z80, a suitable I/O board attached in a slot on the motherboard, and a plurality of suitable timing means such as an Intel 8254 programmable timer providing timing increments of 1/100 of a second. A suitable connecting means in the form of a wiring harness indicated by reference letters a-n attached to the I/O board provides for connecting other components of system 10 individually to controller 14. Referring to FIG. 3, a plurality of individually selectable valve elements mounted along a pilot valve manifold may be managed by controller 14, each valve element in an open position communicating pilot pressure to selectively operate other components of system 10. Alternatively, controller 14 may be a programmable personal computer such as an IBM AT, although other suitable programmable devices may also be used. Controller 14 includes random access memory (RAM) that is battery backed up so that in the event of a power failure, the programmed data remains in memory.

System 10 includes a plurality of selectable liquid inlets 18a, 18b, 18c, 18d, that connect via branches of a conduit 20 with reservoir 12 for filling and replenishing reservoir 12. Each liquid inlet 18a, 18b, 18c, 18d includes an inlet valve 22a, 22b, 22c, 22d respectively. Controller 14 selectively communicates through portions of the wiring harness with each valve 22a, 22b, 22c, or 22d to separately control each valve 22a, 22b, 22c, 22d. Consequently, liquid input to reservoir 12 is selectively controlled.

Each inlet 18a, 18b, 18c, 18d is connected to a separate liquid chemical supply, not shown in the figures, each having the same chemicals. Conventionally, each liquid supply may be in the form of bottles or bags. System 10 automatically replenishes reservoir 12 by selectively opening one valve 22a, 22b, 22c or 22d while the remaining inlet valves remain closed. Therefore, only one inlet as indicated by the heavy line 24 in FIG. 1 may be selected, allowing system 10 to withdraw liquid chemicals from a selected chemical supply while the system operates to block liquid flow through the other inlets so that operating personnel can replenish any empty chemical supply with liquid chemicals. When the selected chemical supply becomes empty, system 10 will automatically switch to another inlet, thus selecting another chemical supply, and allowing the empty chemical supply to be replenished with liquid.

Included with system 10 are a plurality of selectable outlets 26a, 26b, 26c. Outlets 26a, 26b, 26c are connected via branches of a conduit 28 to reservoir 12 to dispense liquid chemicals from reservoir 12. Each liquid outlet 26a, 26b, 26c includes an outlet valve 30a, 30b, 30c respectively. Controller 14 selectively communicates with each valve 30a, 30b, 30c to separately control each valve 30a, 30b, 30c. Consequently, liquid output from reservoir 12 is selectively controlled, allowing liquid to be selectively dispensed from reservoir 12. Therefore, only one outlet, not shown in the figures, or a plurality of outlets as indicated by heavy line 32 in FIG. 1 may be selected. Preferably, each outlet valve 30a, 30b, 30c includes a drawback or check valve portion 34a, 34b, 34c respectively to prevent dripping of chemical on process material within the process equipment receiving the dispense.

Each outlet 26a, 26b, 26c may be connected to a different piece of process equipment, not shown in the figures, to selectively dispense chemicals on demand to the equipment. In order that this be best accomplished, each piece of process equipment is individually connected to controller 14 through the wiring harness or suitable means such as a serial port, and, under the appropriate conditions, each piece of process equipment communicates a demand signal to controller 14 to open the appropriate outlet valve 30a, 30b or 30c and dispense a selected amount of chemicals to it.

A liquid level sensor 36 within reservoir 12 detects high and low liquid level in reservoir 12. Sensor 36 is movable between a high position, indicated in FIG. 1 at 38, and a low position, indicated in FIG. 1 at 40. Sensor 36 communicates to controller 14 a first signal representative of the high liquid level to signify that sensor 36 has sensed the high liquid level, and communicates to controller 14 a second signal representative of the low liquid level to signify that sensor 36 has sensed the low liquid level. Conventionally, sensor 36 may be a single liquid fluids level detector capable of detecting both high and low liquid levels and includes appropriate means for sending different signals signifying the high or low liquid fluids level condition to controller 14. Alternatively, sensor 36 may include a high liquid level sensor and a separate low liquid level sensor, each communicating the appropriate signal to controller 14 representative of the high or low liquid level.

Figure 2:
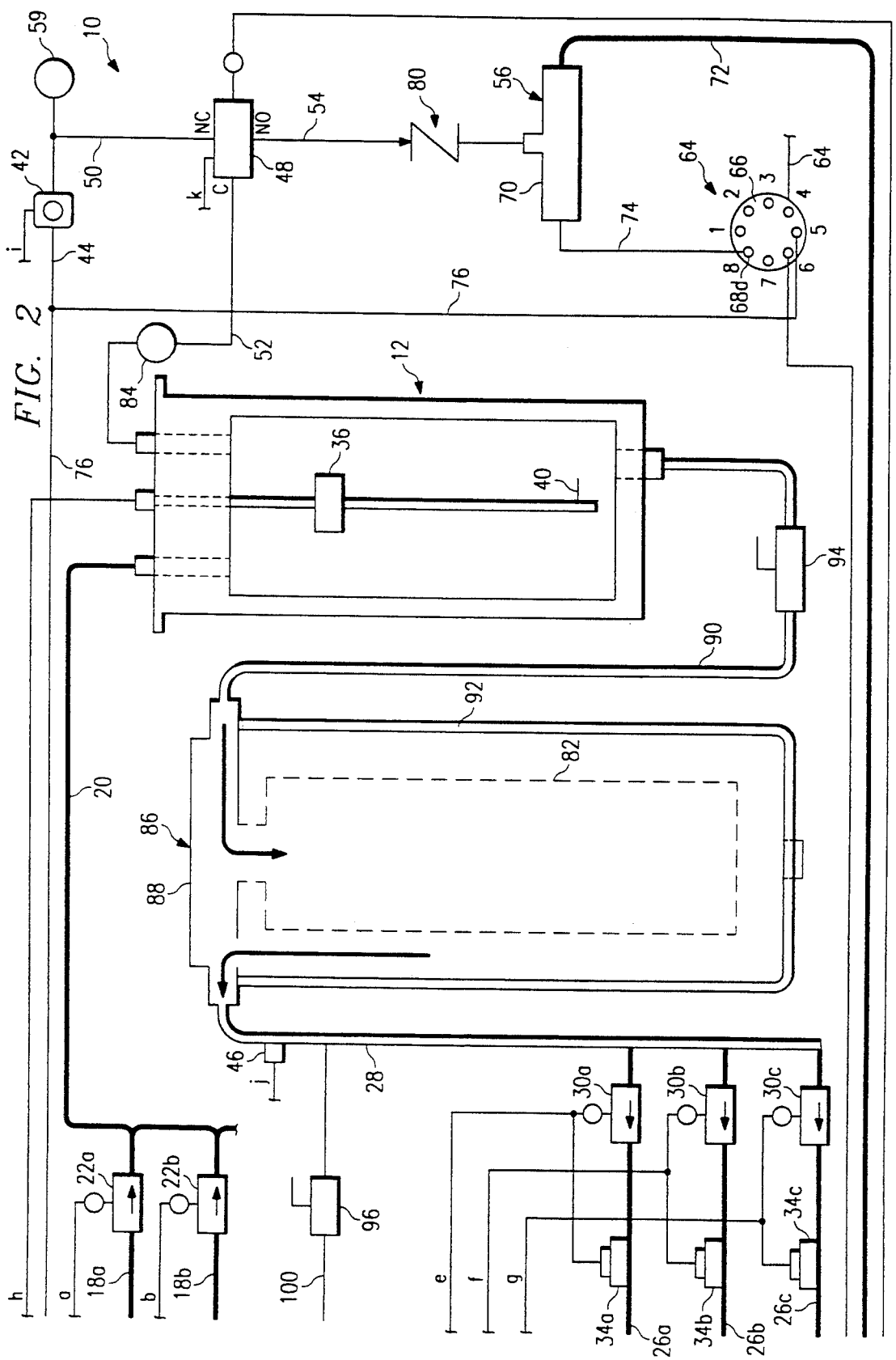
FIG. 2 is a second schematic view of the liquid dispensing system of FIG. 1, showing an alternate preferred filtering arrangement for filtering liquid flow.

A servo controlled electronic pressure regulator 42 provides pressure on demand to act on liquid present in reservoir 12. Referring to FIG. 2, regulator 42 receives compressed nitrogen or air via conduit 44. Typically, the compressed nitrogen will be at a pressure of about 60 psi. Controller 14 manages the operation of regulator 42, causing regulator 42 to provide pressure on demand responsive to a signal from controller 14.

A pressure sensor 46 connects with reservoir 12 to sense its pressure. A servo loop between pressure sensor 46 and regulator 42 through controller 14 is employed to stabilize the pressure acting on reservoir 12 to the outlet pressure programmed by the user before the selected chemical outlet valve 30a, 30b, or 30c will open.

A controllable three-way valve 48 connects via conduits 50, 52, 54 with regulator 42, reservoir 12 and a vacuum venturi 56, described hereafter, respectively. Controller 14 manages the switching of valve 48. Upon receipt of an appropriate signal from controller 14, valve 48 is selectable between a pressure position for applying pressure to reservoir 12 from pressure regulator 42 via conduits 50, 52, and a second vacuum position for evacuating reservoir 12 by means of vacuum venturi 56 or other conventional device for causing a lowered pressure in conduit 54, as discussed below. The pressure position of valve 48 is useable in the on demand pressure dispense mode, and communicates pressure regulator 42 with reservoir 12 via conduits 50, 52 and an exhaust interlock 58, described hereafter. An analog pressure gauge 59, indicated in FIG. 2, may be included in conduit 50 to visually indicate to the operator the pressure applied to reservoir 12. The vacuum position of valve 48 is useable in the filling or venting modes, and communicates reservoir 12 to vacuum venturi 56 via conduits 52, 54 and exhaust interlock 58.

Exhaust interlock 58 is connected in conduit 52 between valve 48 and reservoir 12. Exhaust interlock 58 allows reservoir 12 to vent via venturi 56 when valve 48 is in its vacuum position, therefore equalizing reservoir 12 with atmospheric pressure after each dispense. Exhaust interlock 58 includes an enclosed chamber portion 60 that connects between segments of conduit 52, and a liquid overflow indicating means adjacent chamber portion 60 for detecting the presence of overflow liquid in chamber portion 60 in the event the high level sensor fails. Accordingly the liquid overflow indicating means provides a means for detecting the presence of overflow liquid adjacent interlock 58. Preferably, the liquid overflow indicating means is provided in the form of an electrostatic capacitive sensor 62 attached to the exterior wall of chamber portion 60 that operates to detect the proximity of liquid. Capacitive sensor 62 is connected to controller 14 and passes a suitable signal to controller 14 when liquid is detected adjacent interlock 58. Alternatively, the liquid overflow indicating means may be provided in other forms such as a conventional float switch for detecting liquid adjacent interlock 58. As indicated in FIG. 3, a removable plug 63 may be removed to allow access to chamber portion 60 to clean out any liquid therein when liquid overflow is detected and system 10 is shut down for maintenance.

A selectable valve 64 controls the operation of vacuum venturi 34. Referring to FIG. 3, selectable valve 64 may include a pilot valve manifold 66 and a plurality of individually selectable valve elements 68a–68j that are connected to manifold 66, each valve element being individually selectable via appropriate signals from controller 14 between a closed position, and an open position for delivering a supply of pressurized gas to the appropriate component. Conventionally, vacuum venturi 56 comprises a venturi member 70 having an exhaust conduit 72 and an inlet conduit 74 for receiving compressed nitrogen or other gaseous fluid compatible with the liquid chemical to be dispensed. Exhaust conduit 72 is preferably connected to a compatible house exhaust system, not shown in the figures. Conduit 74 connects to the outlet side of valve element 68d of valve 64, and a conduit 76 connects a supply of pressurized nitrogen gas or air 78 to the inlet side of pilot valve manifold 66 to be selectively distributed by valve elements 68a–68j. In the venturi member, the flow of pressurized gas through the restricted area of venturi member 70 will create a region of reduced pressure in conduit 54 in accordance with Bernoulli's principle. Typically, the reduced pressure may be about ten inches of mercury.

Controller 14 communicates with valve 64 and manages the opening and closing of valve 64. Concurrently with controller 14 switching valve 48 to its vacuum position, controller 14 communicates a signal causing valve element 68d to open. When valve element 68d is opened, pressurized nitrogen gas or air from supply 78 flows through vacuum venturi 56, creating a vacuum or lowered pressure in conduit 54 for evacuating reservoir 12 via conduits 52, 54, exhaust interlock 58 and valve 48 in its vacuum position. A conventional one-way check valve 80 in conduit 54 connecting valve 48 and venturi 56 operates to permit air flow from reservoir 12 while preventing flow of pressurized nitrogen gas or air in the opposite direction through valve 48 and interlock 58 into reservoir 12. At the end of the evacuation process, controller 14 communicates a signal to valve element 68d, causing it to close.

When controller 14 has caused valve 48 to switch to its vacuum position and pressurized gas to flow through vacuum venturi 56, the reduced pressure in conduit 54 acting on reservoir 12 may also be used to refill reservoir with liquid when the liquid level of reservoir 12 has fallen below the low liquid level 40. In order that the reduced pressure may be used to refill reservoir 12 when the system is not in a dispense mode, one of the inlet valves 22a, 22b, 22c or 22d is opened, allowing the reduced pressure in reservoir 12 to draw liquid from the liquid chemical supply present at the opened inlet through the inlet and into reservoir 12.

Alternatively, controller 14 instead of activating a vacuum venturi and causing a reduced pressure in reservoir 12 to draw liquid into reservoir 12, controller 14 may cause a pressure to be applied to the liquid chemical supply forcing the liquid into reservoir 12. This may be accomplished by controller 14 communicating a signal to a valve 81 causing it to open along with controller 14 communicating with pressure regulator 42 to cause nitrogen gas or air of other suitable gaseous fluids at a pre-determined pressure to flow through a conduit indicated by dashed lines 83 and act against the liquid supply, forcing liquid through the opened inlet into reservoir 12.

Alternately, each liquid supply may be pre-pressurized. Consequently, when an inlet is open leading to one of these prepressurized liquid supplies, the pressure inside the liquid supply will force liquid through the open inlet into reservoir 12.

A filter 82 may be included depending on the chemical used and the process demands placed on system 10 by the chemicals. Filter 82, when included, is located between reservoir 12 and outlet valves 30a, 30b, 30c. Alternatively, as shown in FIG. 2, filter 82 may be located outside of reservoir 12 as described in the following paragraph. Another filter 84, which is located before reservoir 12, filters the incoming pressurized gas before the gas enters reservoir 12.

Referring to FIG. 2, filter 82 may be included in a sealed filter housing 86 outside of reservoir 12. Sealed housing 86 includes a flange portion 88 having a suitable inlet and outlet for connecting between conduit segments 28, 90 of the flowline between reservoir 12 and outlets 26a, 26b, 26c, and a removable cylindrical portion 92 for access to filter 82. Alternatively, cylindrical portion 92 and filter 82 may be combined into a conventional screw on canister filter. Reservoir 12 is connected to the input side of housing 86 via conduit 90 leading from the bottom of reservoir 12. A manual valve 94 in conduit 90 allows filter 82 to be changed without draining reservoir 12.

Referring to FIGS. 1 and 3, when filter 82 is located inside reservoir 12, the top of filter 82 is located below the low liquid level at a predetermined point so that a known reserve amount of chemical remains in reservoir 12 above filter 82. The low liquid level position is above filter 82 so that gaseous fluid is restrained from entering filter 82. Alternatively, as shown in FIG. 2, the inlet to filter 82 may be connected to communicate with the lowest level of liquid in reservoir 12 by connecting the inlet side of conduit 90 to the bottom of reservoir 12. Likewise, the low liquid level portion is above the inlet side of conduit 90 so that a known reserve amount of chemical remains in reservoir 12.

Because filter 82 will become saturated with contaminants over a period of time, therefore reducing the flow through filter 82 in relationship to the pressure acting on chemical liquids present in reservoir 12, pressure sensor 46 is located downstream of the liquid flowpath between filter 82 and outlet valves 30a, 30b, 30c as best shown in FIGS. 2 and 3. Consequently, when filter 82 is included, pressure sensor 46 senses both the static pressure of reservoir 12 and the dynamic liquid flow pressure downstream of filter 82. Accordingly, the pressure acting on the liquid in reservoir 12 can be adjusted upwardly to maintain pressure sensor 46 at the same pressure.

When filter 82 is not included, pressure sensor 46 reads the dynamic liquid flow pressure between reservoir 12 and outlet valves 30a, 30b, 30c. Consequently, when filter 82 is not included, pressure sensor 46 likewise allows the pressure acting on the liquid in reservoir 12 to be adjusted to maintain sensor 46 at the same pressure. Whether filter 82 is included or not, the dynamic pressure is sensed, by pressure sensor 46 adjacent outlets 26a, 26b, 26c. Therefore, more than one outlet 26a, 26b or 26c may be open at any time for dispensing, allowing liquid chemicals to be dispensed through more than one outlet to each piece of process equipment demanding a dispense. This is because the servo loop compensates for additional outlets being opened by raising the pressure applied by pressure regulator 42 to maintain the pressure sensed by pressure sensor 46 at the same pressure.

A manual drain valve 96 connected adjacent the bottom of reservoir 12 allows reservoir 12 to be drained manually. A conventional one-way check valve 98 in the drain line 100 connecting drain valve 96 to reservoir 12 prevents backflow from entering reservoir 12 via drain line 100. A cap 102, removable for draining, on drain line 100 protects the interior of drain line 100.

Preferably, controller 14 is capable of handling up to four liquid chemical dispense systems 10. However, it is within the scope of the invention that the overall system may comprise fewer or more chemical dispense systems 10.

Controller 14 includes both visual means and audible means for any empty liquid chemical dispensing supply present at either inlet 18a, 18b, 18c, or 18d. Controller 14 also communicates with the connected processing equipment via the wiring harness in the event a shutdown of system 10 is necessary.

All modes of operation are managed by controller 14. The modes of operation preferably include a calibration mode, a dispense mode, a normal mode, an outgas mode, a purge mode, a drain mode and a quit mode. Controller 14 may include a suitable means such as a serial port for communication with a main computer or other device.

Controller 14 is programmed by the user via keyboard 16 to set the parameters for the modes of operation. Consequently, the user may: a) selectively select either or a combination of chemical inlets 18a, 18b, 18c, or 18d; b) set the pressure sensed by pressure sensor 26; c) set the pressure differential limit or delta pressure between the pressure sensed by sensor 46 downstream of filter 82 and the pressure acting on liquid present in reservoir 12; d) set the time interval dispense for each outlet; e) define the pressure of the servo-loop for consistent liquid flow regardless of the number of outlet valves 30a, 30b, 30c, or 30d that are open; and f) set the peak pressure limit for the pressurized reservoir 12.

System 10 integrates chemical source switching from a plurality of inlets, numbering four in the figures but could be more or less, with liquid level detection and chemical dispensing into one unit. System 10 allows the size of reservoir 12 to be changed so that system 10 is adaptable to a wide variety of chemical dispensing applications. Depending on the chemicals used and the process demands, system 10 will operate with or without filtration in chemical reservoir 12.

Figure 4:
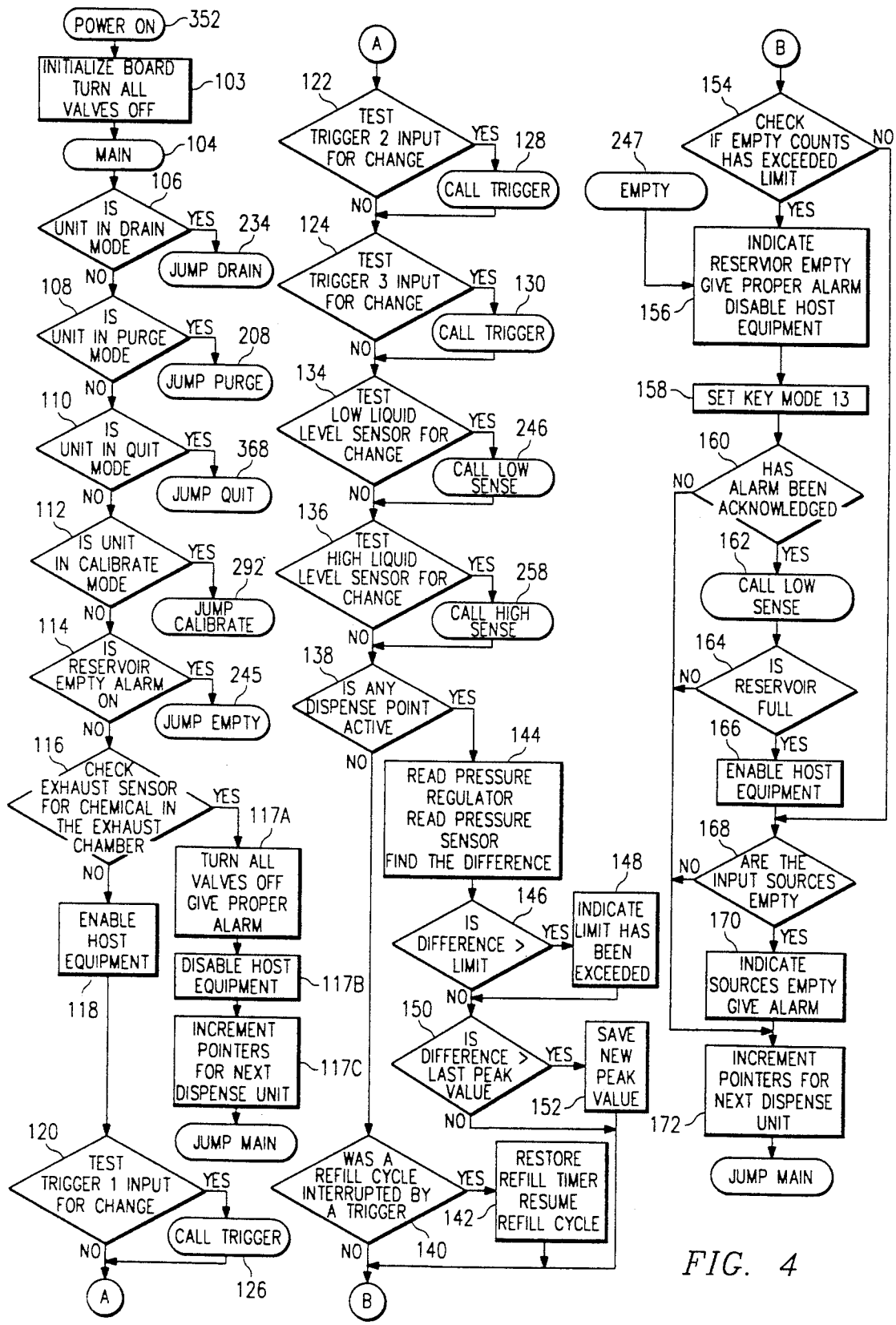
FIG. 4 is a flowchart of the continuously active main or primary mode of operation of the system according to the present invention and the reservoir critically empty sub-mode contained within the main mode.

The operation of the overall system, which may comprise a plurality of liquid dispense systems 10, is as follows. Referring to FIG. 4, the overall system is powered up, all inlet and outlet valves are closed as indicated by block 103, and a continuously active main or primary mode, indicated by continuous block 104, of operation is activated, and each of the dispense systems 10 are selected for output to their connected host process equipment. During the main mode, controller 14 checks if one of the various modes, indicated by blocks 106-112, has been selected for each system 10, if a reservoir critically empty alarm, as defined hereafter, is on as indicated by block 114, and if chemical overflow is present adjacent sensor 62 as indicated by block 116.

If chemical overflow is detected adjacent sensor 62, all inlet and outlet valves of the overflowed system 10 are closed, an overflow alarm, which may be visual or audible is given, and signals are sent by controller 14 to disable the connected host process equipment connected to the overflowed system 10, as indicated by blocks 117a-117b. When more than one system 10 is managed by controller 14, the pointers, each pointer being a register containing data representative of one of the dispense systems 10, are incremented to select another dispense system 10, as indicated by block 117c, and the controller 14 resumes the continuously active main mode, indicated by block 104, allowing maintenance operations to be performed on the overflowed dispense system 10 while other systems 10 remain active. As may be appreciated, further dispensing and refill cycles are suspended from the overfilled reservoir until the overfill is removed.

After checking for modes of operation of each system 10, and chemical overflow adjacent sensor 62 of each system 10, controller 14 sends a signal to each piece of process equipment connected to its system's outlets, enabling operation of each piece of process equipment as indicated by block 118. Thereafter, controller 14 checks for a trigger input change sequentially from each piece of connected process equipment of each system 10 as indicated by blocks 120-124.

Figure 10:
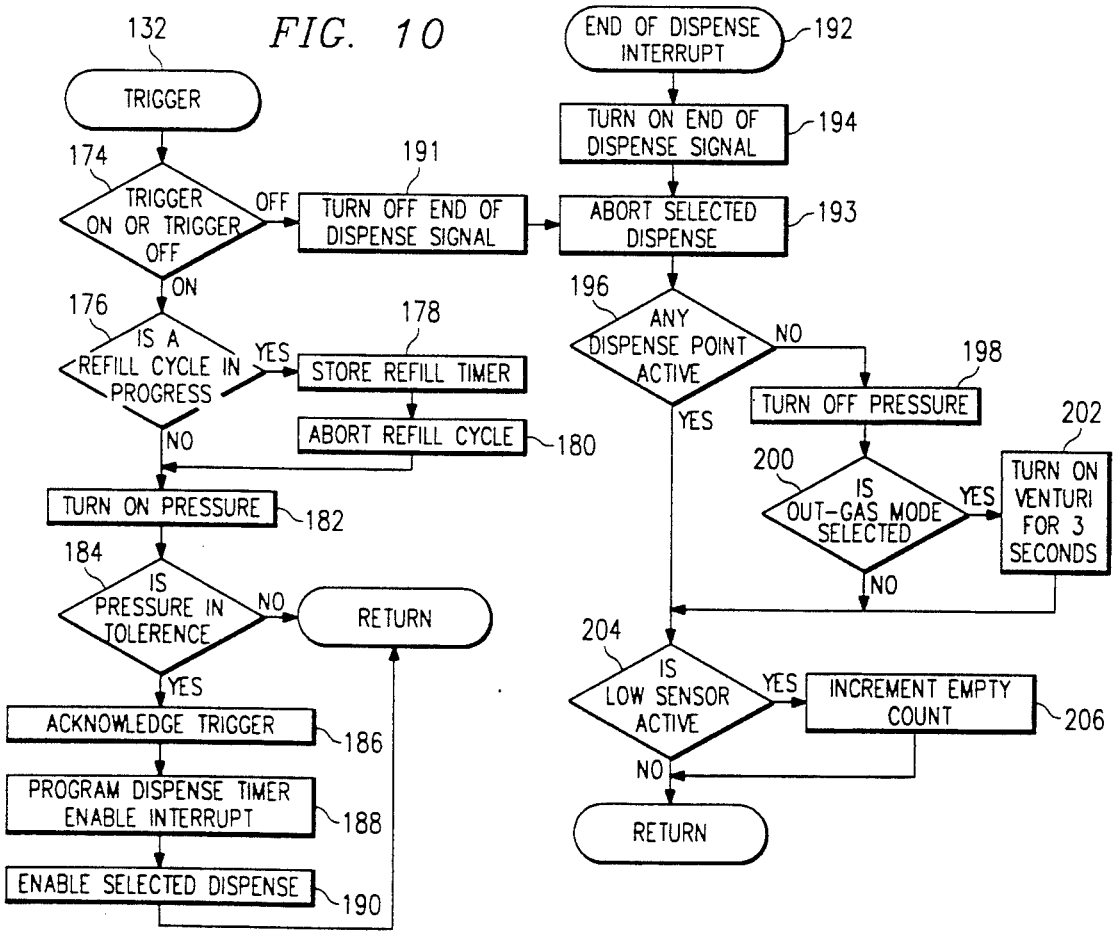
FIG. 10 is a flowchart of the trigger module of the present invention for dispensing liquid on demand, and its end of dispense interrupt sub-module that is activated at the end of the dispense time interval.

If a trigger change from one system 10 is detected, controller 14, as indicated by blocks 126-130 calls a trigger routine module, shown in FIG. 10, entering at block 132. After checking for trigger changes, controller 14 tests the low liquid level signal from sensor 36 of each system 10 for change as indicated by block 134. As may be appreciated, the low liquid level signal controls the filling of each reservoir. If the signal has changed, then controller 14 calls the low sense routine or reservoir refill cycle module, shown in FIG. 11, passing the appropriate system register. After testing the low liquid level signal, controller 14 tests the high liquid level signal from sensor 36 of each system 10 for change as indicated by block 136. If the signal has changed, then controller 14 calls the high sense routine module, shown in FIG. 12, passing the appropriate system register.

After checking the low and high liquid level sensor of each system 10 for change, controller 14 checks to see if a dispense point of any system 10 is active, as indicated by block 138. If none of the dispense points of any system 10 are active, controller 14 checks to see if a refill cycle for that system 10 was interrupted by a trigger signal as indicated by block 140. If the refill cycle was interrupted, the refill timer associated with the interrupted system 10 is restored, and its refill cycle is resumed, as indicated by block 142.

If a dispense point of any system 10 is active, controller 14 reads the pressure applied to its reservoir 12 by the system's pressure regulator 42, the pressure present at pressure sensor 46 of the system, and calculates their difference, as indicated by block 144. A preferred way to measure the pressure applied by regulator 42 is by controller 14 reading the voltage or current of the servo loop across the coil of regulator 42. A preferred way to measure the pressure present at sensor 46 is by controller 14 reading the voltage across sensor 46 or current through sensor 46. Controller 14 takes the value representative of the pressure applied by regulator 14, the value of the pressure present at sensor 46 and calculates their difference, which is compared to a pre-set limit for that system 10 defined by the operator, as indicated by block 146. If the difference is greater than the limit defined by the operator, then by visual or audible means, controller 14 indicates that the preset limit for that system has been exceeded, as indicated by block 148, and that it is now time for changing the filter 82 of the system. The pre-set limit of each system is variable depending on the viscosity of the particular chemical being dispensed by the system and filter size, i.e. 0.2 microns or 0.5 microns. The value of the difference is next compared to the last saved peak difference for that system, as indicated by block 150. If the difference is greater than the last saved peak difference, the new peak difference is saved, replacing the old value, as indicated by block 152.

After controller 14 checks whether a dispense point for any system 10 was active and if a refill cycle for each active dispense system was interrupted, controller 14 checks to see if the empty counts for each system 10 have exceeded the limit, as indicated by block 154. The height of liquid present between the filter, if present, or outlet to reservoir 12, and the low liquid level 40 of each system 10, along with the dimensions of each reservoir 12 allow the reserve volume of liquid present between the low liquid level 40 and the filter or reservoir outlet to be determined for each system 10. This reserve volume for each system 10, therefore, allows for a pre-determined number of dispenses before the system's reservoir 12 is critically empty. This pre-determined number of dispenses for each system 10 represents the maximum number of empty counts for that system.

If the number of empty counts for any system 10 has exceeded the limit for that system, controller 14 enters the critically empty sub-mode 247 diagramed by blocks 156–164 of FIG. 4. When the critically empty mode is entered, no further dispenses are allowed until the reservoir is refilled. After entering the empty mode, Controller 14 indicates that reservoir 12 of that system is critically empty by audible or visual alarm means, and disables the host process equipment of that system, as indicated by block 156. The keyboard mode is interrupted and set, as indicated by block 158 corresponding to block 160 in FIG. 14 along with FIG. 28. Next, controller 14 checks to see if the alarm means for the empty system has been acknowledged, as indicated by block 160. If the alarm means has been acknowledged, controller 14 begins refilling reservoir 12 of the empty system by calling the low sense or refill cycle routine, shown in FIG. 8, as indicated by block 162, passing the empty system register. Next, controller 14 checks for whether reservoir 12 of that system 10 is full as indicated by block 164 by calling the high sense routine. If reservoir 12 of that system 10 is full, as indicated by block 166, each piece of connected host process equipment of that system is re-enabled.

After checking for whether the number of empty counts of any system 10 has exceeded the limit, controller 14 then checks for whether any liquid supply source present at inlets 18a, 18b, 18c or 18d of any system 10 is empty, as indicated by block 168. If all liquid sources present at inlets 18a, 18b, 18c or 18d of one of the systems are empty, a liquid supply alarm which may be visual or audible is given identifying the empty liquid chemical sources, as indicated by block 170, allowing the operator to replenish all or one of the empty liquid supply sources.

Controller 14 then increments the pointer registers with information identifying the next system 10, and the controller 14 resumes continuing the main mode of operation from its initial activation point, as indicated by block 104. Consequently, each system 10 is checked in succession for modes of operation, chemical overflow adjacent its sensor 62, trigger inputs, liquid level, active dispense point, interrupted refill cycle, empty counts, and empty input sources.

When the dispense mode is selected by a trigger "on" signal from a piece of process equipment demanding a dispense of chemical, the trigger "on" signal is communicated to controller 14 and identified with the specific piece of equipment demanding the dispense as indicated by decision blocks 120, 122 and 124 of FIG. 4. The "on" signal may originate in an electrical or pneumatic form that is converted by a suitable interface to a usable signal indicative of an "on" condition and is communicated to controller 14. Controller 14 then calls as indicated by blocks 126, 128, 130 the trigger routine, shown in FIG. 10, entering at block 132, and passes parameters to the subroutine identifying the system, and the specific outlet 26a, 26b or 26c of the system that is connected to the equipment calling for the dispense.

Because an "on" signal is passed to the trigger routine, the trigger decision block 174 selects the "on" branch of the routine. After entering the "on" branch, controller 14 tests whether a refill cycle for the reservoir of the system leading to the specified outlet is in progress as indicated by block 176. If a refill cycle is in progress, the refill timer information is stored in a register identified with the reservoir of that system, and the refill cycle is aborted, as indicated by blocks 178 and 180. Once the refill cycle is resumed at the end of the dispense mode, then the refill time is resumed from its point of termination. The dispense mode will override all refill cycles except when the reservoir is critically empty.

After checking for the presence of a refill cycle, the three-way valve 48 associated with the identified system is moved to its pressure position responsive to a signal from controller 14. Along with moving valve 48 to its pressure position, the pressure regulator 42 associated with the identified system responsive to a signal from controller 14 begins to apply pressure to the selected reservoir 12 via conduits 50, 52 and exhaust interlock 58 of the identified system as indicated by block 182.

Controller 14 determines the pressure present at sensor 46 by reading the voltage across sensor 46 or current through sensor 46. When the servo-loop between pressure sensor 46 and pressure regulator 42 stabilizes to the user selected pressure for sensor 46, within a pre-set tolerance, as indicated by decision block 184, controller 14 acknowledges the trigger "on" signal status as indicated by block 186. After acknowledging the trigger on signal, controller 14 programs the timer controlling the particular outlet valve leading to the equipment communicating the demand signal with the pre-set time interval selected by the operator for that particular piece of equipment, and enables the end of dispense interrupt for later activation by the timer at the end of the pre-set time interval as indicated by block 188. Controller 14 then enables the selected dispense outlet by communicating an opening signal to the particular outlet valve associated with the selected outlet, as indicated by block 190.

However, if an "off" signal is passed to the trigger routine, decision block 174 selects the "off" branch of the routine. After entering the "off" branch, controller 14 turns off the end of dispense signal for the selected outlet as indicated by block 191, aborts the selected dispense as indicated by block 193, performs the operations indicated by blocks 196–206 described hereafter and returns to the calling program.

An orifice in the selected outlet, not shown in the figures, along with the pressure maintained at pressure sensor 46 determines the flow rate. The flow rate together with the operator selected time interval programmed into the timer by controller 14 allows a predetermined specific amount of liquid chemical to be dispensed to the connected piece of process equipment. At the end of the pre-determined time period programmed into the timer, the timer automatically sends a signal to the opened outlet valve, causing it to close, and activates the end of dispense interrupt sub-module, causing a jump to the end of dispense interrupt, indicated by block 192. As may be appreciated, the programmed time for dispense does not start until the selected outlet valve 30a, 30b, or 30c opens after the servo-loop stabilizes.

When the end of dispense interrupt is activated as indicated by block 192, an end of dispense signal is given for the opened outlet that is being closed as indicated by block 194. After the end of dispense signal is given, controller 14 aborts the selected dispense as indicated by block 193 and checks whether any other dispense point of the selected reservoir is still active, as indicated by decision block 196. If no other dispense point is active, the pressure applied to the reservoir via the selected pressure regulator 42 is turned off, as indicated by block 198.

After the pressure is turned off, the three-way valve 48 associated with the selected reservoir is moved to its second vacuum position, and a check is made whether the out-gas mode has been selected, as indicated by decision block 200. If the outgas mode has been selected, the venturi associated with the selected reservoir is activated by controller 14 communicating a signal causing a flow of pressurized gas to flow through the venturi for three seconds, as indicated by block 202, thus creating a vacuum or lowered pressure for evacuating gas from the selected reservoir. The outgas mode evacuates any air or nitrogen present in reservoir 12 and allows the system to be in its own environment. A signal for another dispense cycle, however, overrides this mode.

If the outgas mode is not selected, the normal mode, not shown in the figures, is selected. In the normal mode, the selected reservoir is automatically vented to atmospheric pressure via the selected, but inactivated vacuum venturi, and the three-way valve in its second position. A request for another dispense cycle also overrides this mode.

After checking whether any dispense point for the selected reservoir is active, the low liquid level signal is tested for change as indicated by block 204. If the low liquid level signal indicates that liquid level is below the low liquid level, then the empty count is incremented, as indicated by block 206. After testing the low liquid level signal, the end of dispense interrupt is disabled and the subroutine returns to the address in the program where the interrupt occurred.

Electronic pressure regulator 42 will adjust depending on the output load to keep programmed pressure sensor 46 constant. Chemical filter 82 will become loaded over time. Consequently, pressure regulator 42 adjusts the pressure applied to reservoir 12 upwardly in order to maintain the pressure sensed by pressure sensor 30 at the programmed value.

Figure 6:
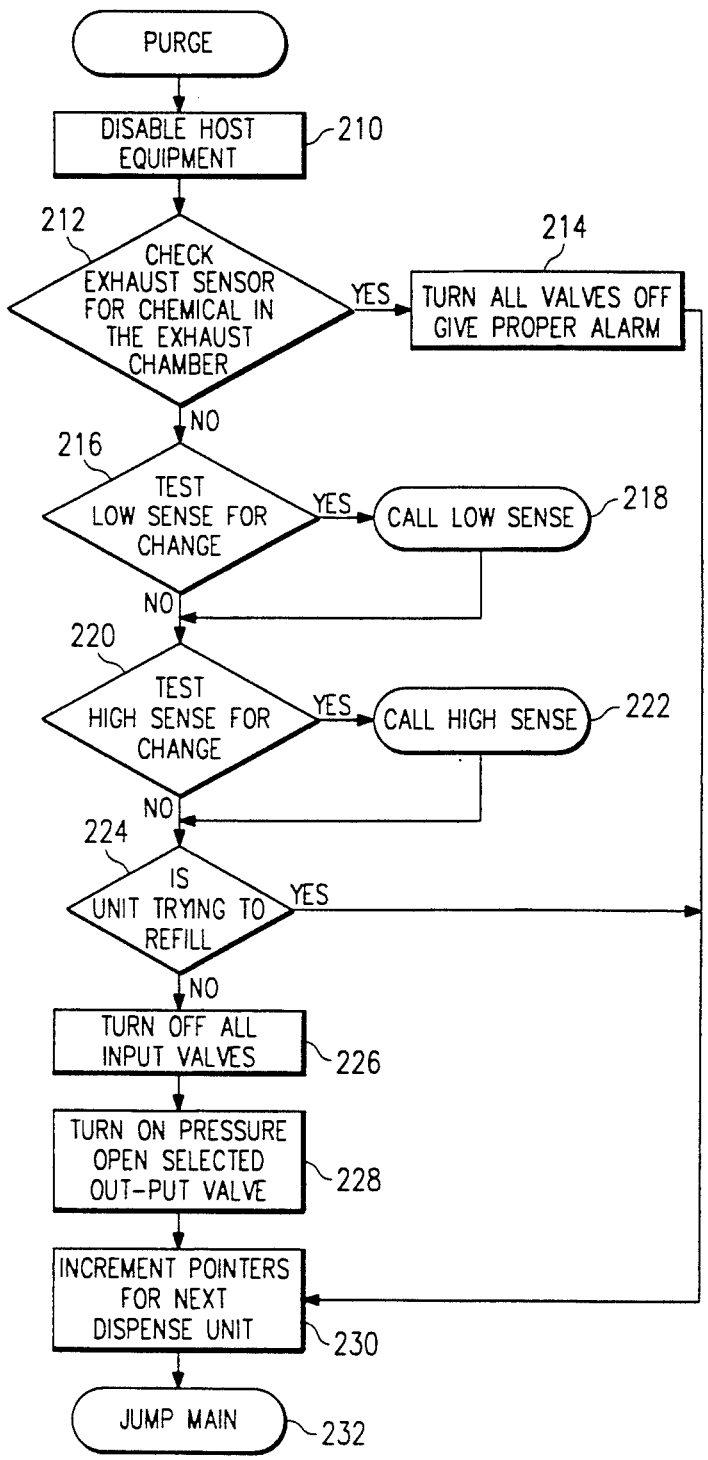
FIG. 6 is a flowchart of the purge mode of the present invention.

When maintenance on a system is required, the purge mode shown in FIG. 4 is selected, the purge mode is called, as indicated by block 208, and parameters are passed indicating which system is to be purged. Referring to FIG. 6, the purge mode is shown in detail. First, the host process equipment connected to the system to be purged are disabled via signals from controller 14, as indicated by block 210. After disabling the host equipment, controller 14 tests the signal from overflow sensor 62 for the presence of liquid adjacent interlock 58, as indicated by block 212. If the signal indicates that liquid is adjacent interlock 58, then all inlet and outlet valves of the system to be purged are closed off, and an overflow alarm, which may be visual or audible, is given, indicating the system where overflow is detected, as indicated by block 214.

If no liquid overflow is detected adjacent interlock 58, controller 14 tests the low liquid level signal from sensor 36 of the system to be purged for a change as indicated by block 216. If the signal is changed, as indicated by block 218, controller 14 calls the low sense routine, shown in FIG. 11, passing the appropriate system register. After testing the low liquid level signal, controller 14 tests the high liquid level signal from sensor 36 of the system to be purged for change as indicated by block 220. If the signal has changed, as indicated by block 222 controller 14 calls the high sense routine, shown in FIG. 12, passing the appropriate system register.

After checking the low and high liquid level sensor of the system to be purged, controller 14 checks to see if the reservoir of the system to be purged is trying to refill as indicated by block 224. If the reservoir of the system to be purged is not trying to refill, controller 14 turns off all its inlet valves 22a, 22b, 22c, as indicated by block 226. After turning off its input valves, controller 14 sends a signal to three-way valve 48 causing the valve to move to its pressure position communicating pressure regulator 42 with reservoir 12, allowing pressure from regulator 42 to act on the reservoir to be purged, and, a pre-selected outlet valve of the system to be purged is opened, allowing the reservoir to be purged as indicated by block 228. After activating the pressure regulator 42 and opening the selected outlet valve, the pointer registers, each register containing data of one of the systems, are incremented to select the next dispense system, as shown in block 230, and the purge routine returns to the main mode as indicated by block 232, but the purge mode remains active until the operator via the keyboard terminates the cycle.

Figure 5:
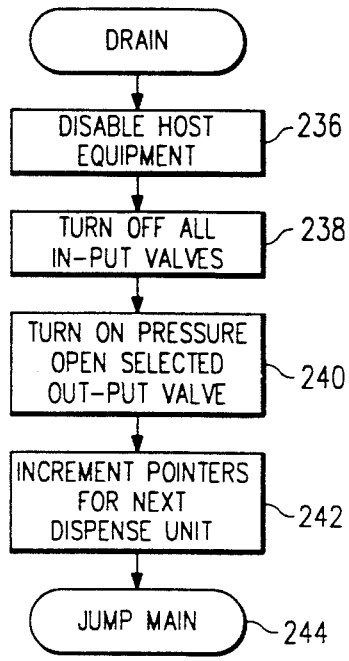
FIG. 5 is a flowchart of the drain mode of the present invention.

When it is desired to drain a system, the drain mode is selected, as indicated in FIG. 4, the drain mode is called, as indicated by block 234, and parameters are passed indicating which system is to be drained. Referring to FIG. 5, the drain mode is shown in detail. First, the host process equipment connected to the system to be drained is disabled via signals from controller 14, as indicated by block 236. After disabling the host equipment, controller 14 sends signals turning off all inlet valves 22a, 22b, 22c of the system to be drained, as indicated by block 238. After turning off all of the inlet valves, controller 14 applies pressure to the reservoir to be drained similarly as described in the purge mode and opens a selected outlet valve, allowing the reservoir to be drained, as indicated by block 240. After applying pressure to the reservoir to be drained and opening the selected valve, the pointer registers, each register containing data representative of one of the systems, are incremented to select the next dispense system, as indicated by block 242, and the drain mode returns to the main mode as indicated in block 244, but the drain mode remains active until the operator via the keyboard terminates the drain cycle. This has the advantage of allowing the lines leading to the outlets to dry.

For the purge and drain modes, controller 14 allows the operator to select a "0" outlet valve. This selection allows the system, which is purged or drained, to cycle, and when used in conjunction with the manual drain valve 96 of the system to be drained or purged, allows the chemistry to go to drain, supply or be sampled at that point.

When a reservoir critically empty alarm is present, as indicated by block 114 of FIG. 4, or if the empty counts have exceeded the limit as indicated by block 154 of FIG. 4, controller 14 via a "jump to" as indicated by block 245 or "empty count" decision block 154 enters the critically empty sub-mode 247 diagramed by blocks 156-164 as described above, checks whether the input sources are empty as indicated by block 168 described above, increments the pointer registers as indicated by block 172 described above, selects another system, and continues the main mode. The empty chemical reservoir 12 can be filled by pressure feed, gravity feed or any kind of static pressure type input. Preferably, the filling is by the arrangement provided by vacuum venturi 56.

Figure 11:
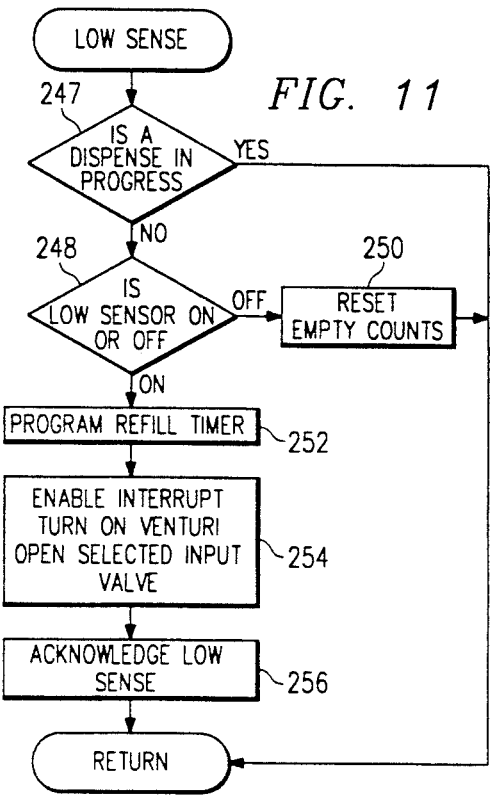
FIG. 11 is a flowchart of the low sense module of the present invention.

Referring to FIG. 11, when the low sense or reservoir refill module is called via blocks 162, 218 or 246, controller 14 first checks to see if a dispense is in progress as indicated by block 247. If a dispense is in progress, the routine returns to the calling program. If a dispense is not in progress, controller 14 checks for whether a low liquid level signal is present, as indicated by block 248. If a low liquid level signal is not present, the empty count for the system is reset to a predetermined value as indicated by block 250 and the subroutine returns to the calling routine. If the low liquid level sensor indicates a low liquid level, controller 14 programs one of the timers controlling one of the inlet valves leading to the empty reservoir with a preselected time interval for refilling as indicated by block 252. After programming the timer, the refill interrupt is enabled, signals are sent by controller 14 to the three-way valve 48 leading to the empty reservoir placing it in its vacuum position communicating vacuum venturi 56 with the empty reservoir and to valve 64 causing pressurized gas to flow through vacuum venturi 56 as described above creating a vacuum or lowered pressure in conduit 54 and hence reservoir 12, and the selected inlet valve 22a, 22b or 22c controlled by the timer is opened via a signal from the timer as indicated by block 254, allowing liquid to be drawn into the empty reservoir by the reduced pressure present in reservoir 12. After enabling the refill interrupt, activating the vacuum venturi, and opening the selected inlet valve, the low liquid level signal is acknowledged as indicated by block 256 and the subroutine returns to the calling program.

Alternately and not shown in the algorhythms, instead of placing the three-way valve of the system needing a refill in its vacuum position, signals may be sent by controller 14 to servo valve 81 causing it to open along with controller 14 communicating with pressure regulator 42 to cause gaseous fluid at a pre-determined pressure programmed by the operator to flow through conduit 83 and act against the selected liquid supply, forcing liquid through the opened valve into the reservoir to be filled.

Figure 12:
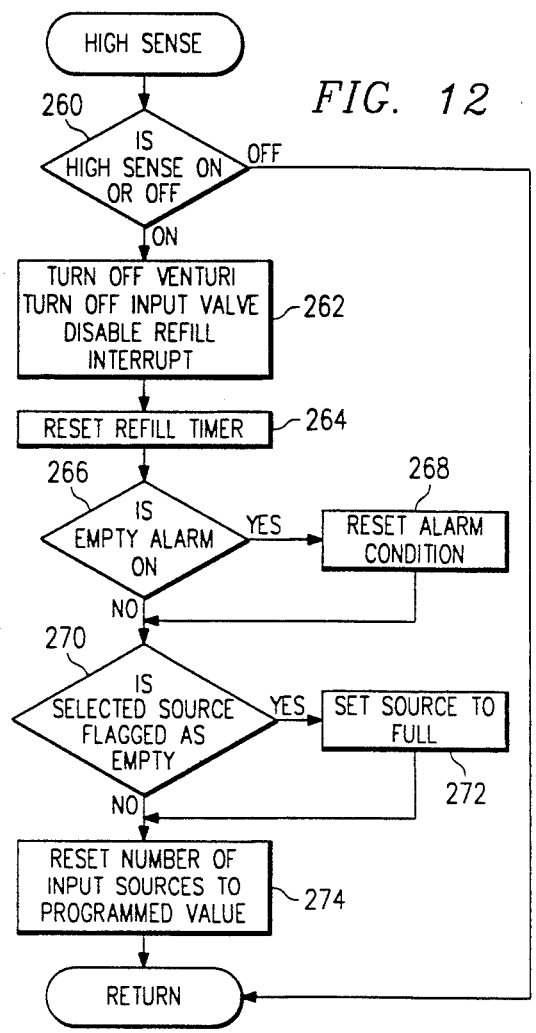
FIG. 12 is a flowchart of the high sense module of the present invention.

When the liquid level sensor 36 of one of the systems sends the signal indicating a high liquid level in its reservoir 12, the high sense module is called as indicated by blocks 164 and 258 of FIG. 4. Referring to FIG. 12, the high sense subroutine module is shown. When the module is entered, controller 14 first checks for whether a high liquid level signal is present as indicated by block 260. If a high liquid level signal is not present then the subroutine returns to the calling routine. If a high liquid level signal is present, controller 14 sends a signal to valve 64 deactivating the vacuum venturi 56 of the filled reservoir and a signal to the selected inlet valve causing it to close, and disables the refill interrupt as indicated by block 262. After turning off the venturi, closing the inlet valve, and disabling the refill interrupt, the refill timer is reset to the predetermined time interval as indicated by block 264. After resetting the refill timer, controller 14 checks to see if the reservoir empty alarm for the reservoir that was filled is on as indicated by decision block 266. If the reservoir empty alarm is on, the alarm is reset to a non-empty status as indicated by block 268. After checking for reservoir empty alarm status, controller 14 checks whether the selected reservoir has been flagged in memory as empty as indicated by block 270. If the reservoir was flagged as empty, the flag is reset to indicate the selected reservoir is now full as indicated by block 272. After checking for whether the reservoir has been flagged as empty, the empty count of the refilled reservoir is reset to the programmed value as indicated by block 274, and the subroutine returns to the calling program.

Figure 13:
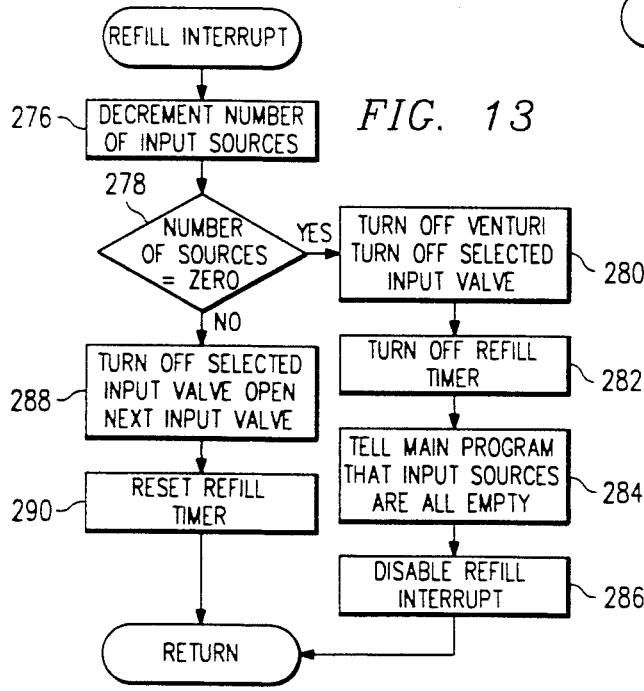
FIG. 13 is a flowchart of the refill interrupt module of the present invention that is enabled during the low sense routine.
Figure 14:
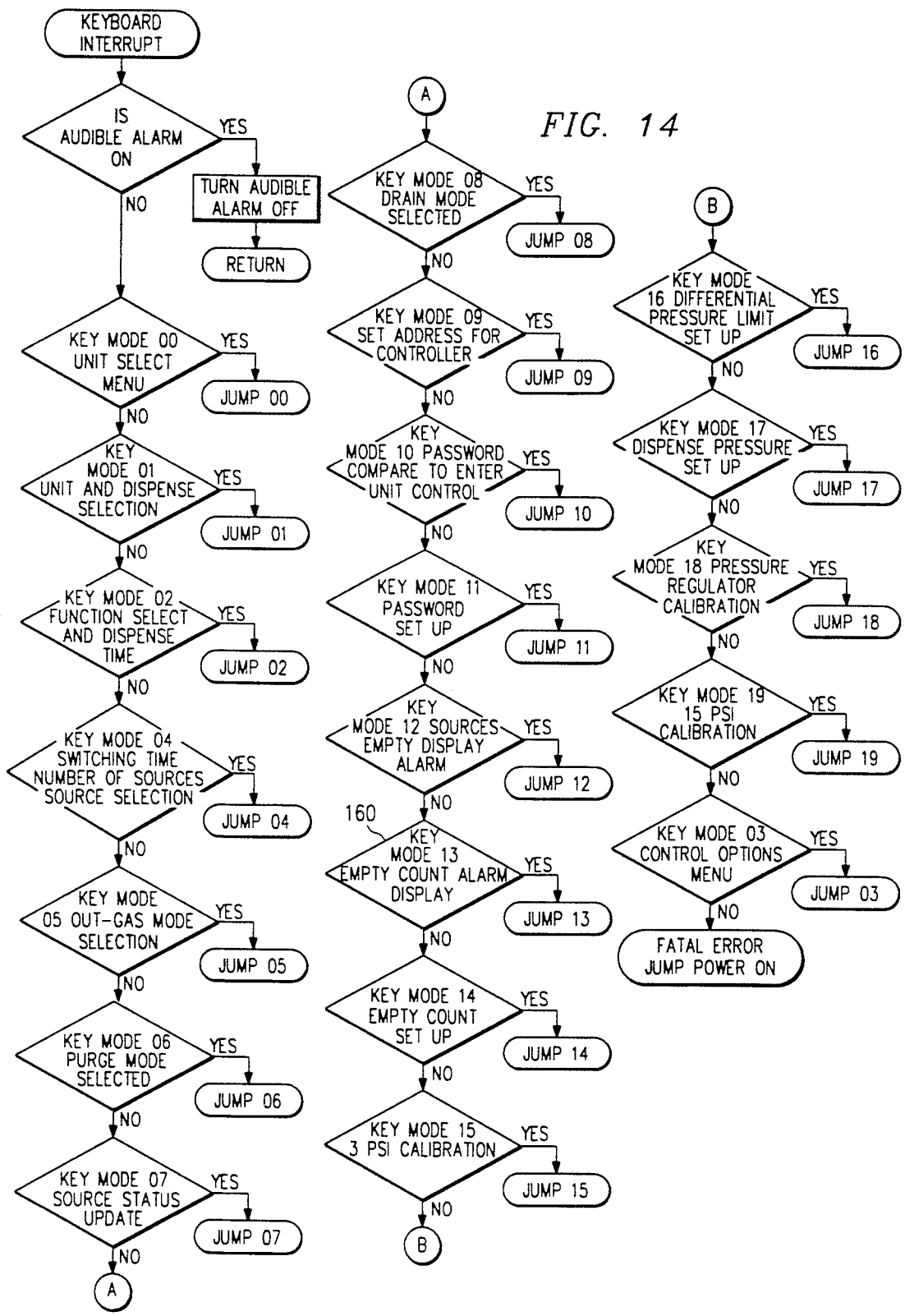
FIGS. 14–34 are flowcharts of the continuously active keyboard interrupt routine and its sub-routines.
Figure 15:
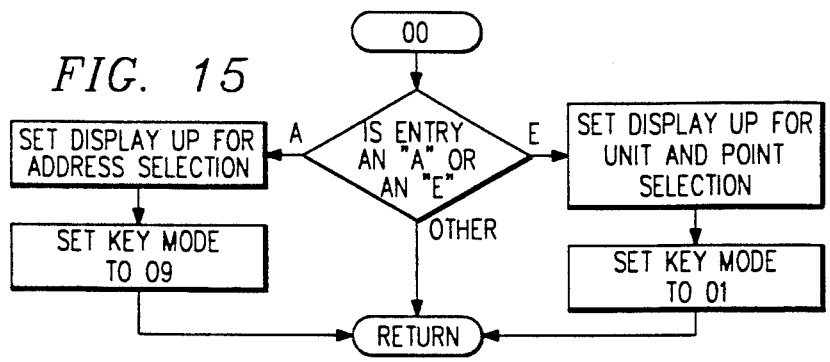
Figure 16:
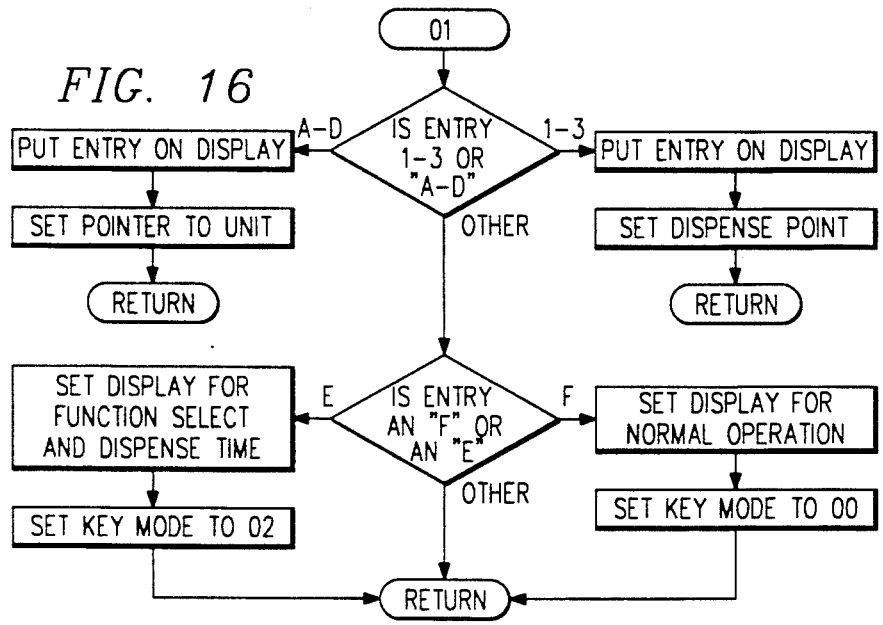
Figure 17:
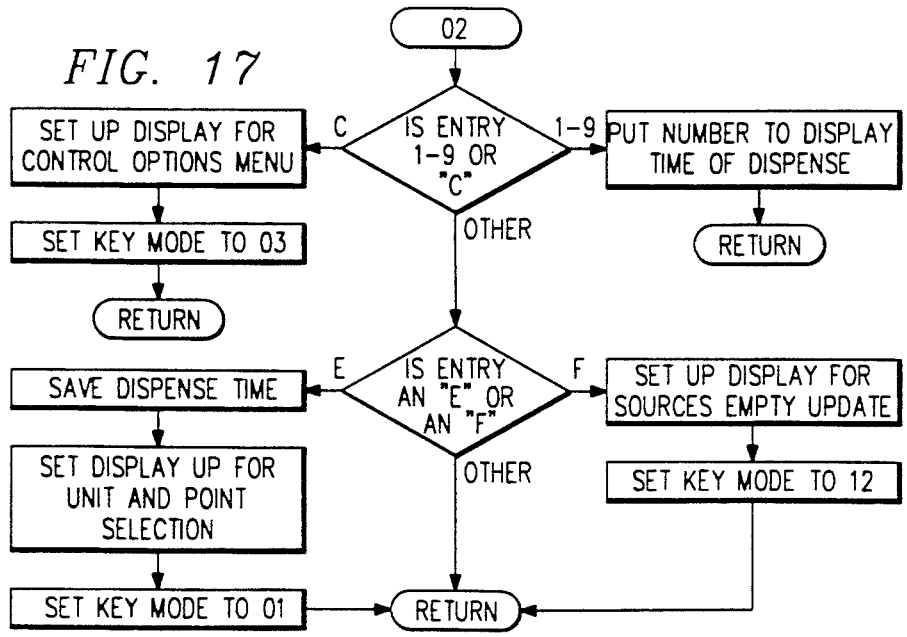
Figure 18:
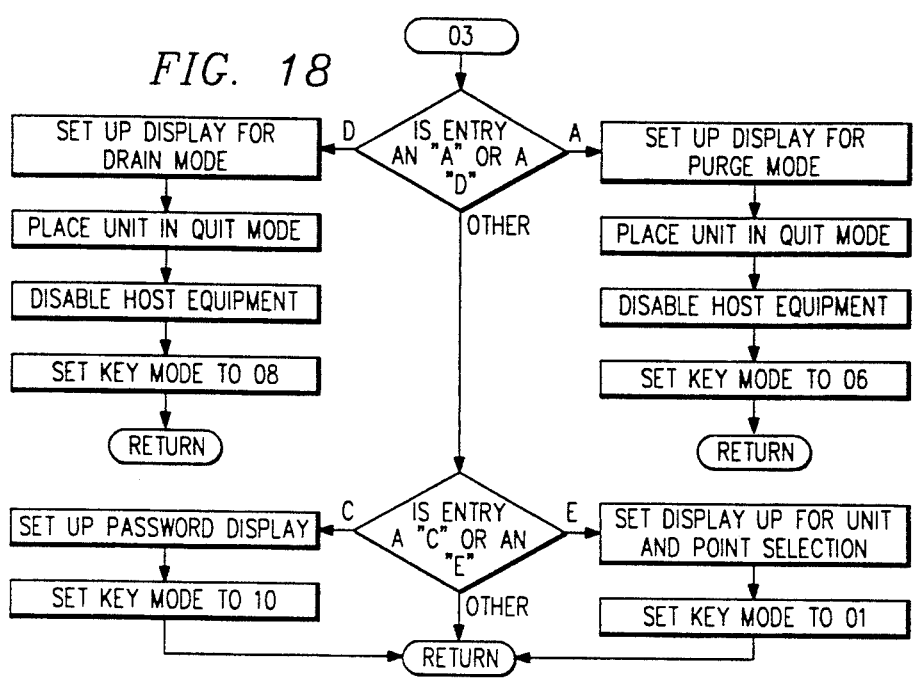
Figure 19:
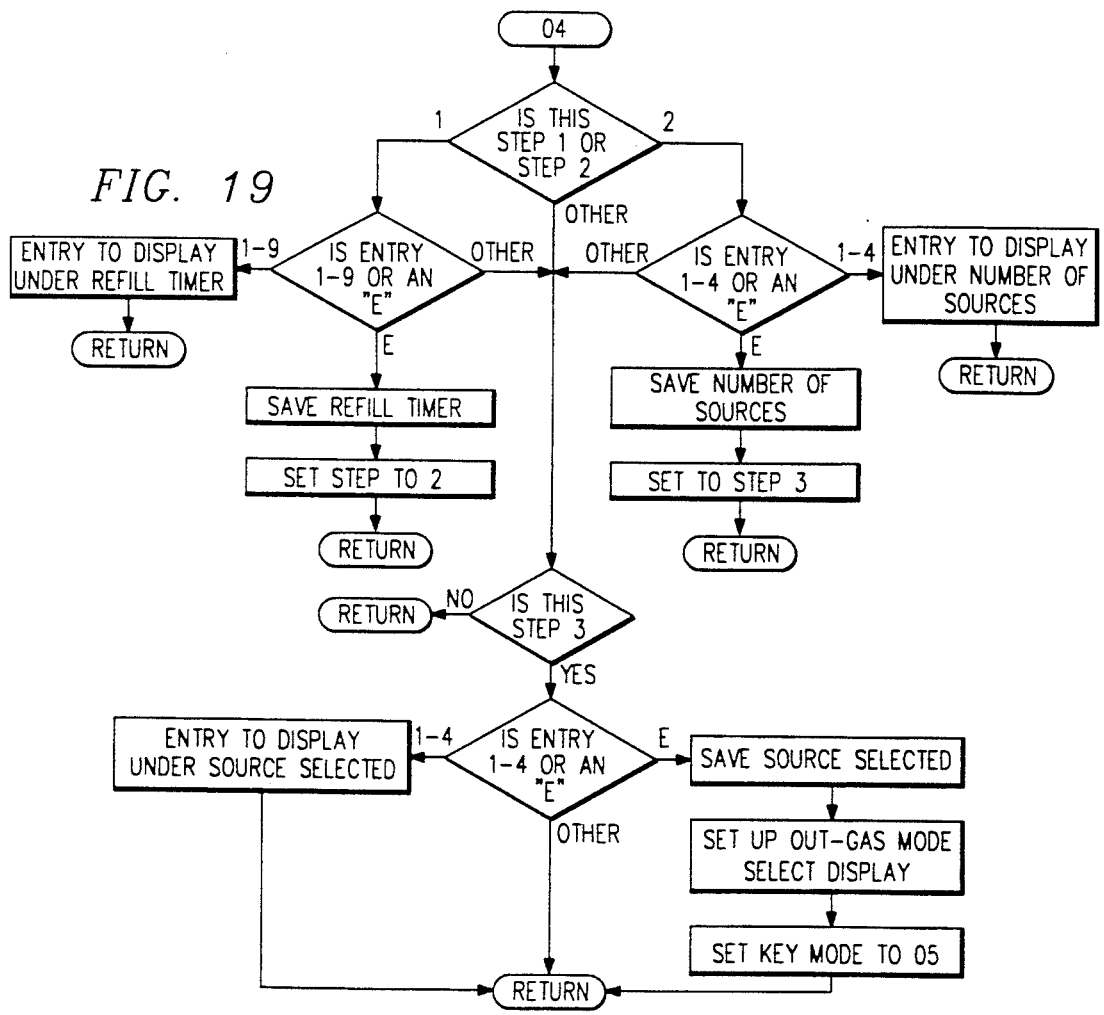
Figure 20:
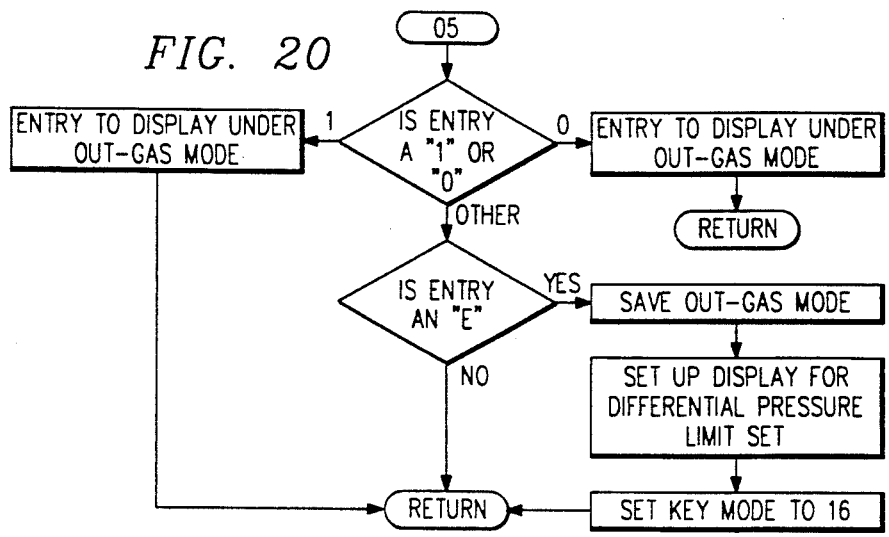
Figure 21:
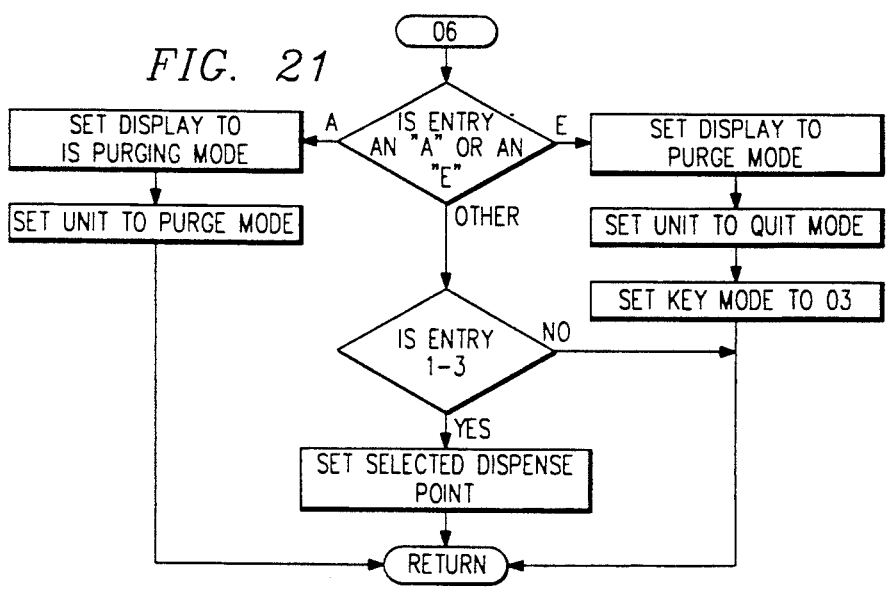
Figure 22:
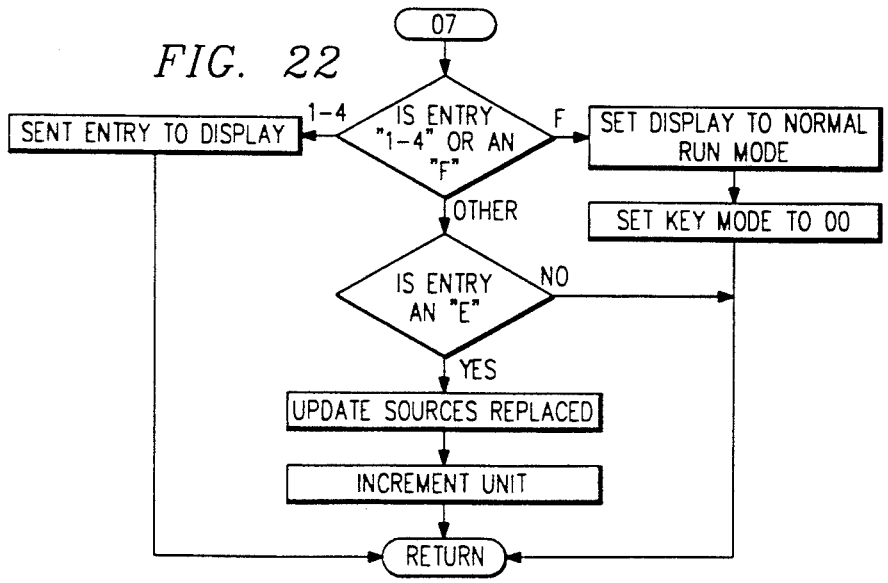
Figure 23:
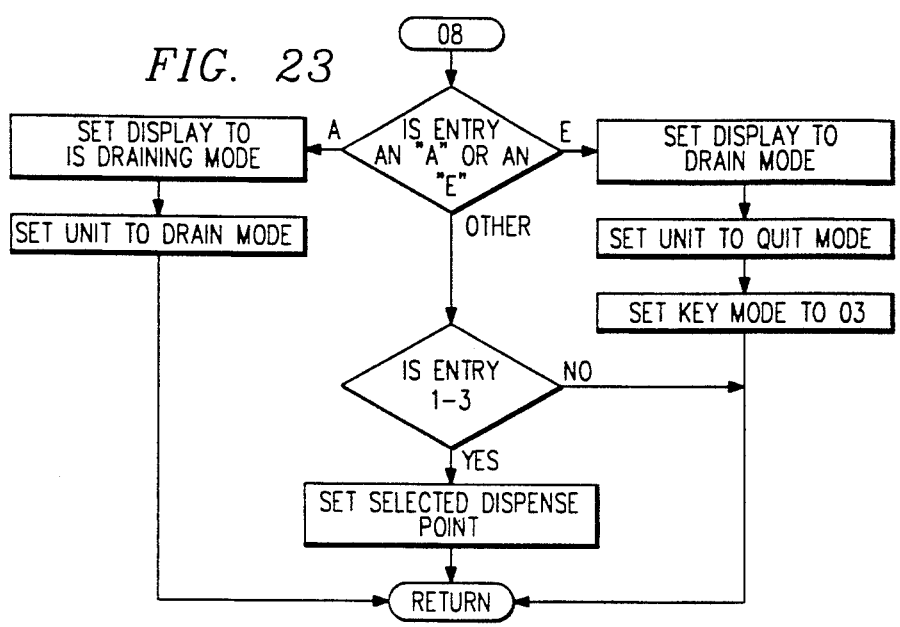
Figure 24:
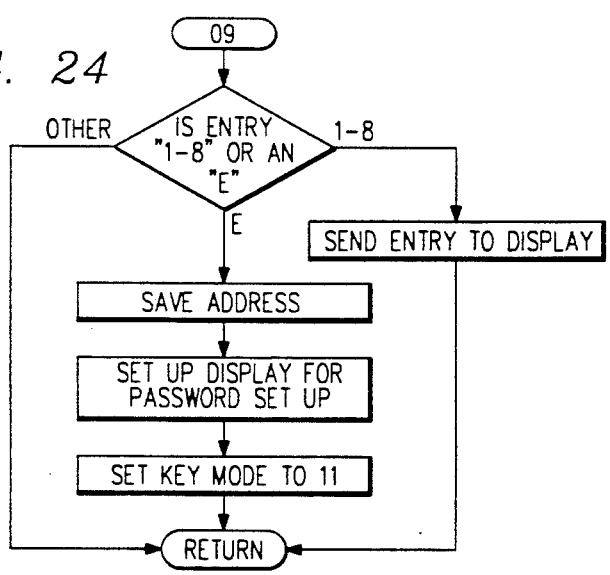
Figure 25:
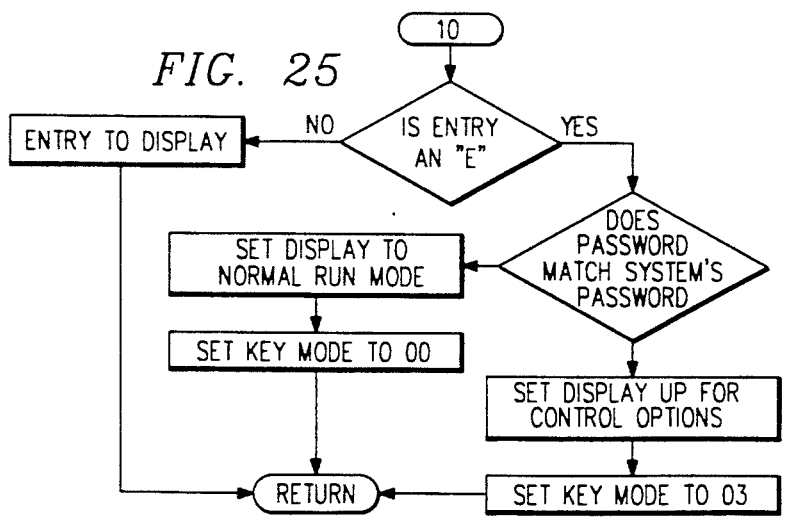
Figure 26:
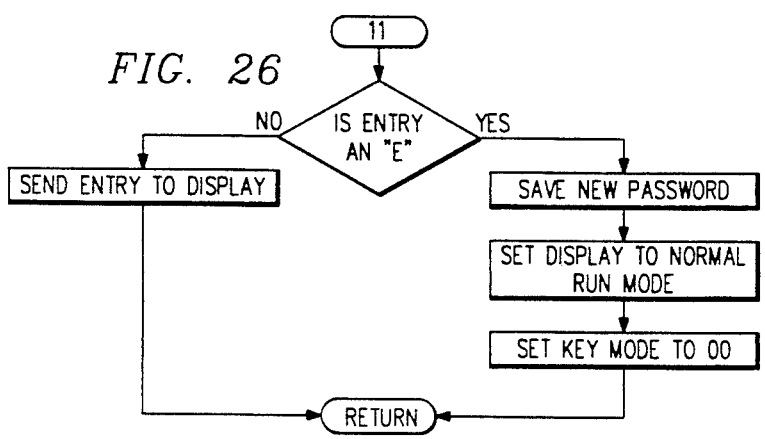
Figure 27:
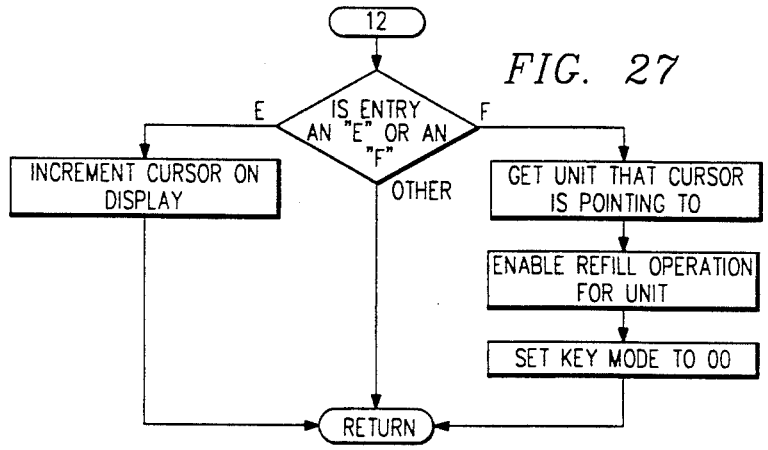
Figure 28:
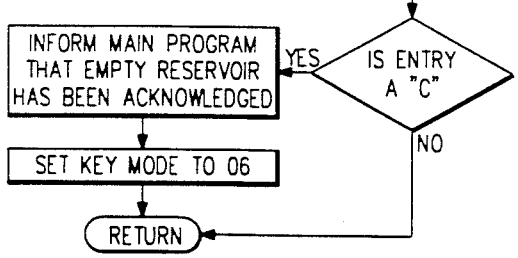
Figure 29:
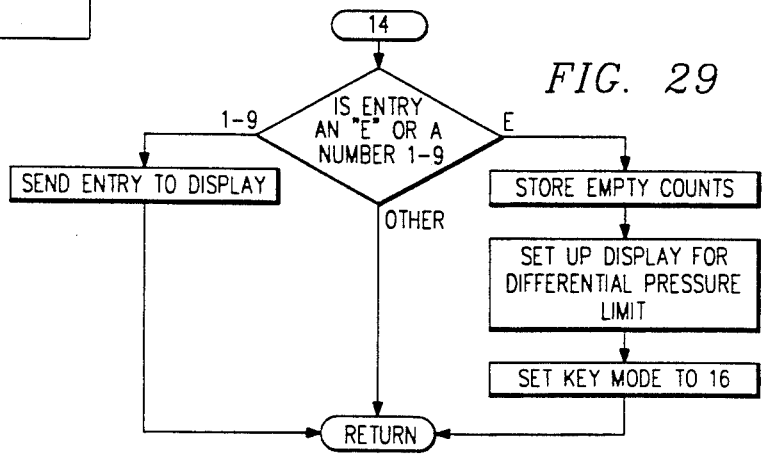
Figure 30:
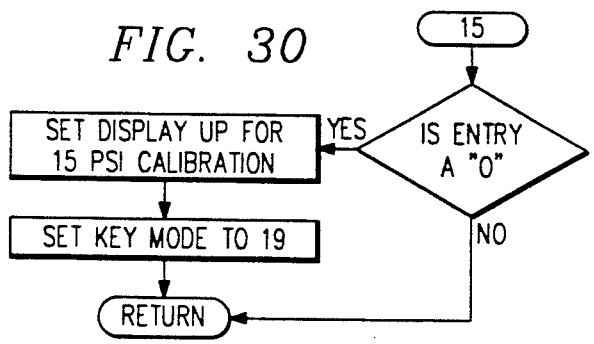
Figure 31:
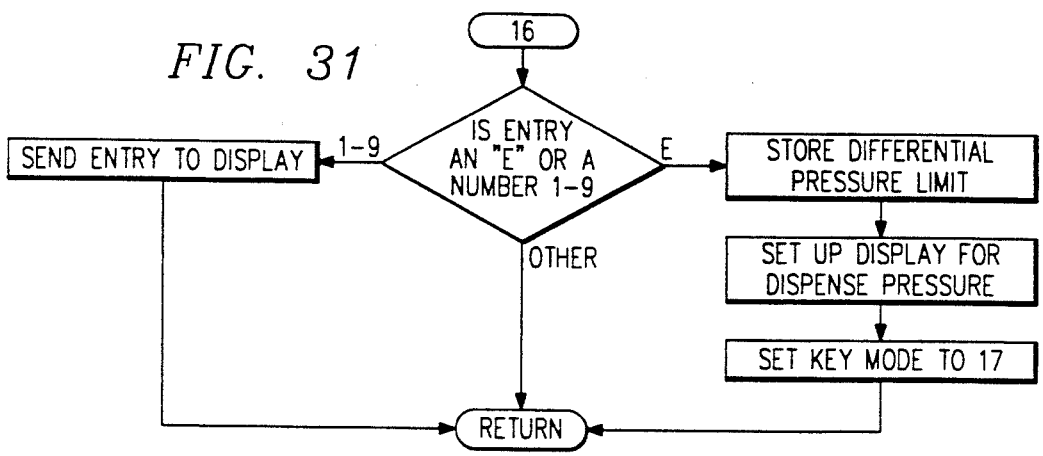
Figure 32:
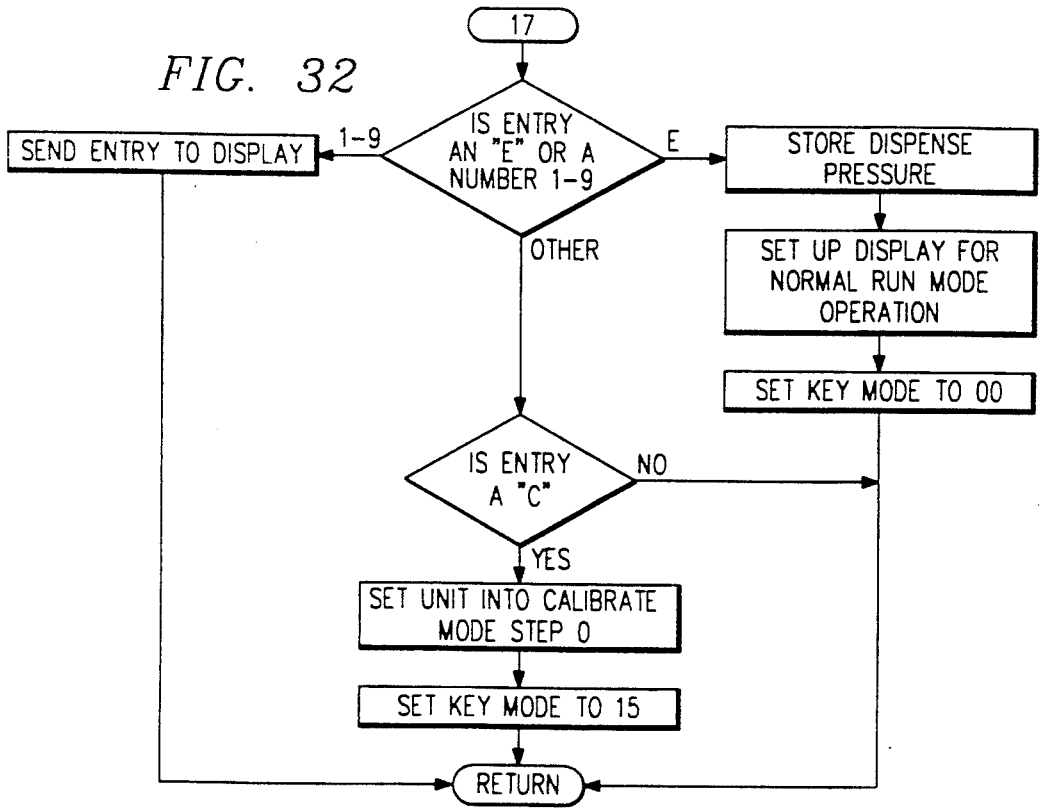
Figure 33:
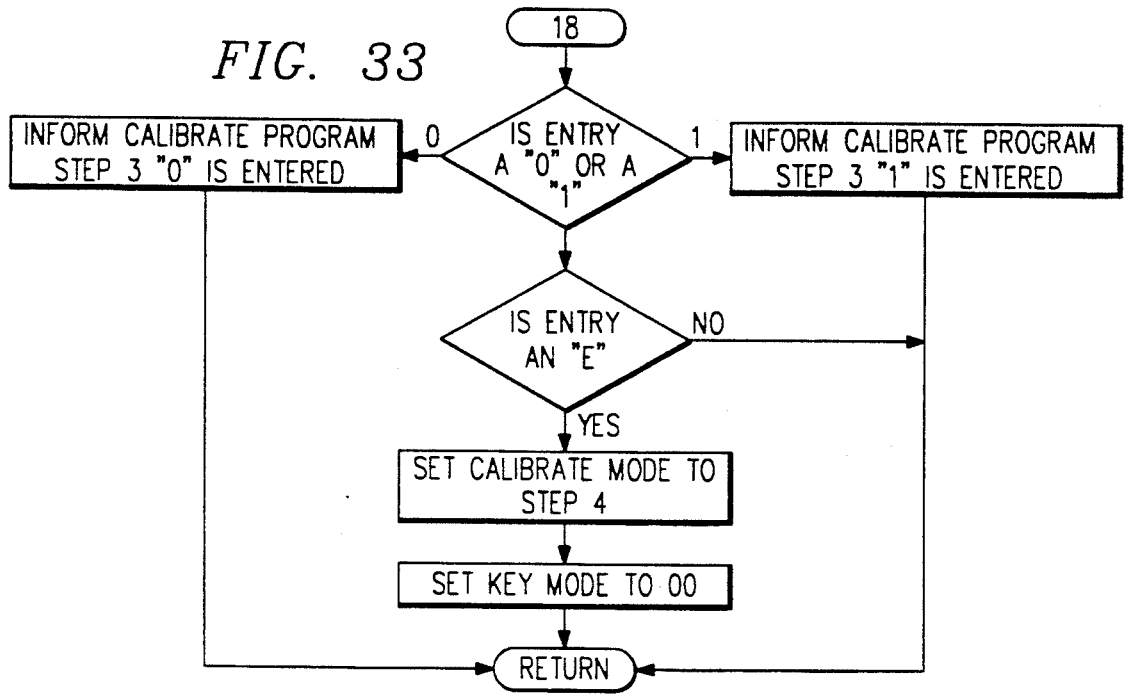
Figure 34:
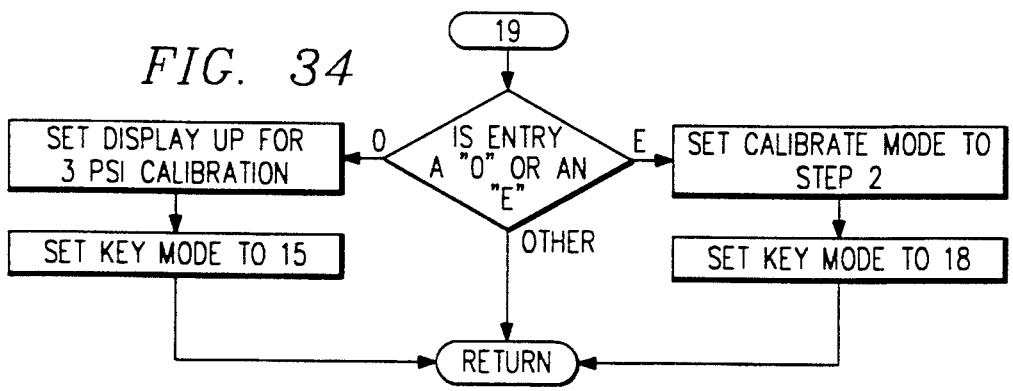

When the reservoir which is filling is not filled within the preselected time interval, the liquid chemical supply present at the selected inlet is considered empty by controller 14 and the refilled interrupt module shown in FIG. 13 is called. Referring to FIG. 13, when the refill interrupt module is called, the number of available liquid chemical supplies connected to the inlets leading to the reservoir are decremented to indicate one of the liquid supplies is now empty, as indicated by block 276. After decrementing the number of available liquid chemical supplies, a check is made whether the number of liquid chemical supply sources remaining is equal to zero, as indicated by block 278, indicating that all liquid supply sources of the system are empty. If the number of liquid chemical supply sources remaining are equal to zero then the vacuum venturi 56 activated for filling the reservoir is deactivated, and the selected inlet valve via a signal from controller 14 is closed as indicated by block 280. After deactivating the venturi and turning off the selected inlet valve, the refill timer is turned off as indicated by block 282. After turning off the refill timer, parameters are passed to the main program signifying that all the liquid chemical supply sources leading to that reservoir are empty as indicated by block 284. After passing parameters to the main program, the refill interrupt is disabled as indicated by block 286 and the subroutine returns to the address in the calling program where the interrupt occurred.

If the number of liquid chemical supply sources are not equal to zero, then the selected inlet valve is closed off and another inlet valve leading to the reservoir to be filled is opened via signal from controller 14 as indicated by block 288 and the reservoir continues filling from another liquid supply source. Preferably, this switching can occur between four individual inlets. After closing the empty inlet and opening another inlet valve, the refill timer controlling the opened inlet valve is reset to the predetermined time interval for filling the reservoir as indicated by block 290, and the subroutine returns to the address in the calling program where the interrupt occurred.

Figure 8:
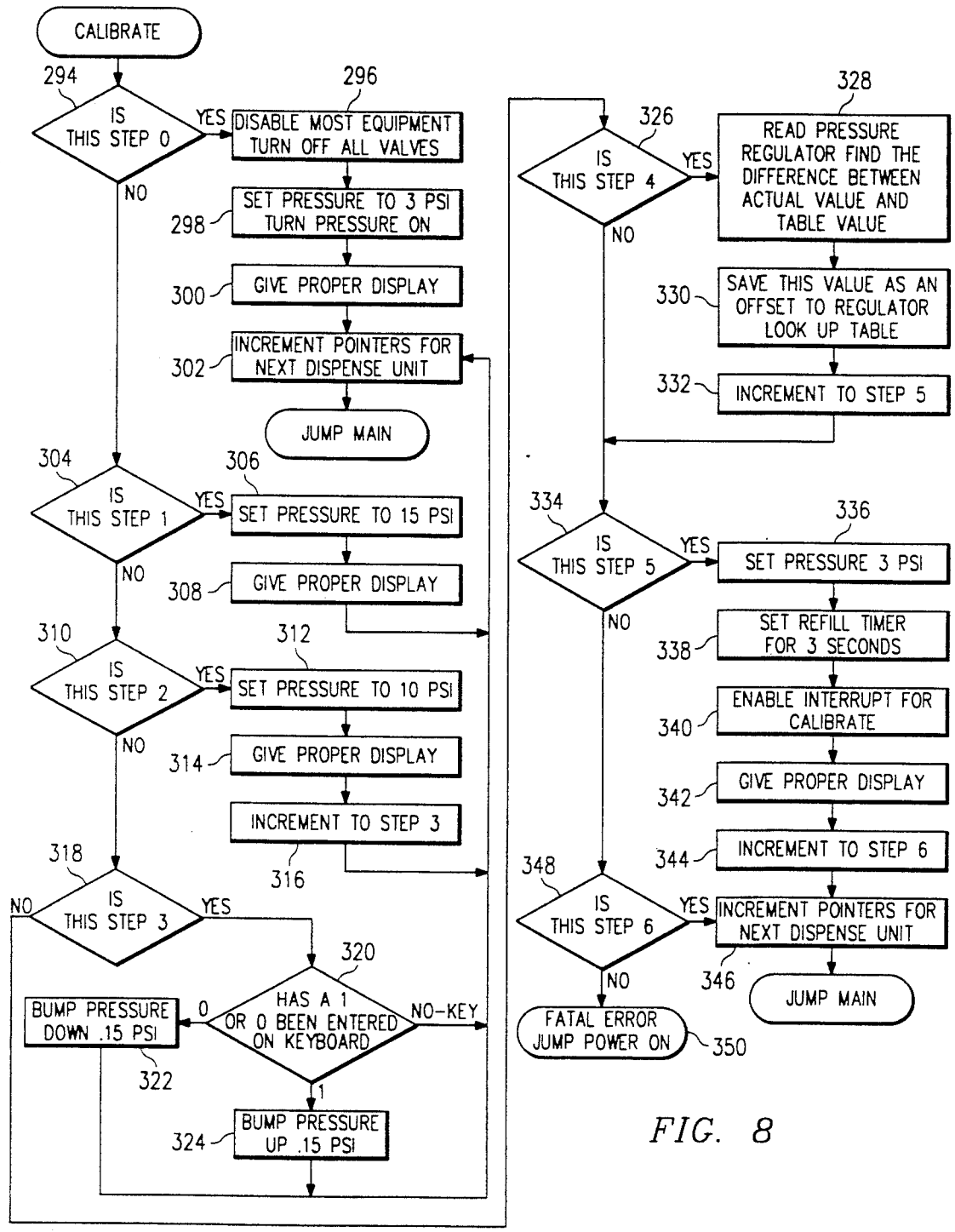
FIG. 8 is a flowchart of the calibration mode of the present invention.

When calibration of a system is required, the calibration mode is selected, as indicated in FIG. 4 and the calibration routine is called, as indicated by block 292, the step counter is initalized to step zero and parameters are passed indicating which system is to be calibrated. Referring to FIG. 8, the calibration mode is shown in detail. First controller 14 checks whether the step counter of the system to be calibrated indicates step zero, as indicated by block 294. If the step counter indicates step zero, controller 14 sends signals disabling the host equipment connected to the system to be calibrated, along with signals to return all inlet and outlet valves of the system to be calibrated to their closed position as indicated by block 296. After disabling the host equipment and closing off all the valves, controller 14 communicates the pressure regulator 42 of the system to be calibrated with its reservoir by sending a signal to the three-way valve 48 of the system, causing the valve to be moved to its pressure portion and sets the pressure of the regulator to 3 psi, as indicated by step 298. After setting the pressure and turning the pressure on, controller 14 displays the information for the operator as indicated by block 300. After displaying the information to the operator, controller 14 increments the pointer registers, each register containing information for one system, for the next dispensing system, increments the step counter by one step and returns to the calling program.

If the step counter indicates step 1, as indicated by decision block 304, the pressure regulator 42 connected to the system to be calibrated is set to a pressure of 15 psi as indicated by block 306 and this information is displayed to the operator as indicated by block 308. The pointer registers are incremented for the next dispense system as indicated by block 302, the step counter is incremented by one step and the subroutine returns to the main calling routine.

If the step counter indicates step 2, as indicated by decision block 310, controller 14 communicates with the pressure regulator 42 of the system to be calibrated, causing its pressure to be set to 10 psi as indicated by block 312. After causing the pressure to be set to 10 psi, controller 14 displays information indicating the pressure is set to 10 psi, as indicated by block 314. After displaying the information to the operator, the step counter is incremented to step 3, as indicated by block 316 and the pointer registers are incremented for the next dispense system as indicated by block 302 and the subroutine returns to the main program.

If the step counter indicates step 3, as indicated by decision block 318, a check is made whether a "1" or a "0" has been entered via the keyboard as indicated by decision block 320. If no entry has been made, the pointer registers are incremented for the next dispense system as indicated by block 302 and the subroutine returns to the calling program. If a "0" has been entered, controller 14 communicates the signal to the active pressure regulator 42 causing the pressure to be lowered by 0.15 psi as indicated by block 322. After lowering the pressure, the pointer registers are incremented for the next dispense system as indicated by block 302 and the subroutine returns to the calling program. If a "1" has been entered via the keyboard, controller 14 sends a signal to the active pressure regulator 42 causing the pressure applied to be increased by 0.15 psi as indicated by block 324. After incrementing the pressure, the pointer registers are incremented for the next dispense system as indicated by block 302 and the subroutine returns to the calling program. Whenever the system indicates 10 psi to the operator, then the operator selects an appropriate entry via the keyboard which is communicated to controller 14 and which causes the step counter to be incremented to step 4.

If the step counter indicates step 4, as indicated by decision block 326 controller 14 reads the current across the coil of the active pressure regulator to determine the value of the pressure applied to the reservoir, and calculates the difference between the value of the pressure read and a preset table value entered by the operator as indicated by block 328. After finding the difference, the value read is saved in memory as an offset to a preset table value as indicated by block 330. After saving the value read, the step counter is incremented to 5 as indicated by block 332.

If the step counter indicates step 5, as indicated by a decision block 334, controller 14 communicates with the active pressure regulator and sets the pressure applied to the reservoir to 3 psi as indicated by block 336. After setting the pressure, the refill timer for the reservoir is set to three seconds as indicated by block 338. After setting the timer, the calibrate interrupt is enabled as indicated by block 340. After enabling the interrupt, the pressure information and timer information are displayed via the terminal or other appropriate means for the operators inspection as indicated by block 342. After displaying the information to the operator, the step counter is incremented to step 6 as indicated by block 344. After incrementing the step counter, the pointer registers are incremented to select the next dispense system as indicated by block 346 and the subroutine returns to the calling program.

If the step counter indicates step 6, as indicated by block 348, the pointer registers are incremented for the next dispense system as indicated by block 346 and the subroutine returns to the main program. If the step counter indicates a step value greater than 6 as indicated by block 348 then a fatal error is present and a soft boot power on is executed as indicated by block 350, causing the program to jump to the power on cycle as indicated by block 352 in FIG. 4 and the overall system is reinitialized.

Figure 9:
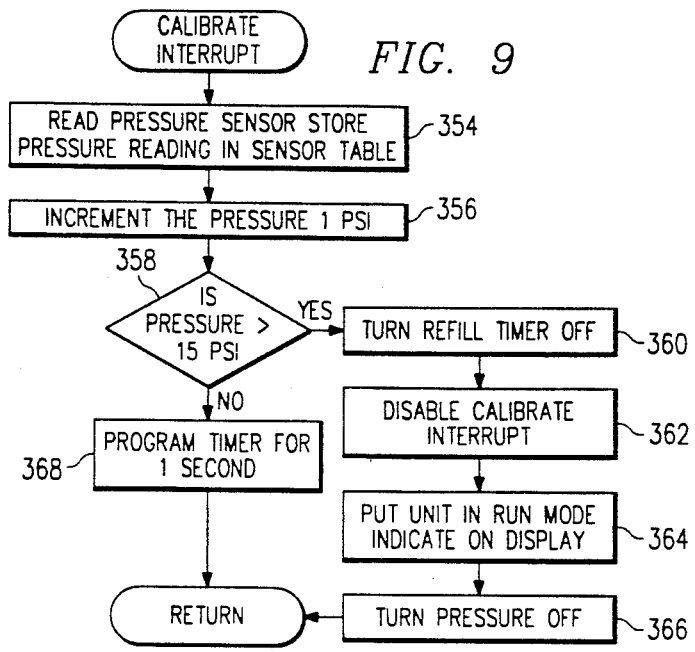
FIG. 9 is a flowchart of the calibration interrupt module of the present invention that is enabled during the calibration mode.

When the time set in blocks 338 or 368 has expired, the calibrate interrupt routine module is entered. Referring to FIG. 9, the calibrate interrupts subroutine is shown. When the routine is called, controller 14 reads the value of the pressure present at pressure sensor 46 and stores the value of the pressure reading in memory in a sensor table as indicated by block 354. After reading the pressure, controller 14 communicates with the active pressure regulator causing the pressure regulator to increase the pressure applied to the reservoir by 1 psi as indicated by block 356. After incrementing the pressure, controller 14 reads the pressure at pressure sensor 46 and checks whether the value of the pressure is greater than 15 psi as indicated by block 358. If the value of the pressure is greater than 15 psi, the refill timer is turned off as indicated by block 360, the calibrate interrupt is disabled as indicated by block 362, and the calibrated system is placed in its run mode and its run mode status is indicated on the display of the controller as indicated by block 364. After placing the calibrated system in its run mode, controller 14 communicates with its pressure regulator 42 causing the pressure applied to the reservoir to be turned off as indicated by block 366 and the interrupt module returns to the address in the calling program where the interrupt occurred.

If the value of the pressure sensed by pressure sensor 46 is not greater than 15 psi, the timer is reprogrammed for an additional one second as indicated by block 368 and the calibrate interrupt routine returns to the address in the calling program when the calibrate interrupt occurred.

Figure 7:
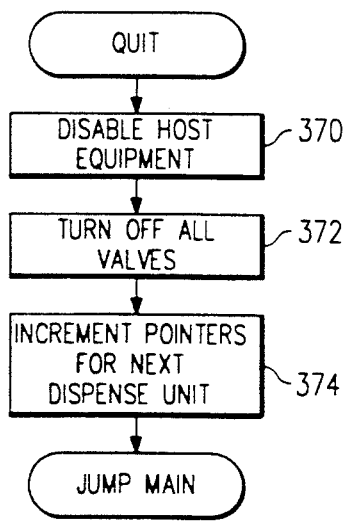
FIG. 7 is a flowchart of the quit mode of the present invention.

When it is desired to deactivate one system, the quit mode is selected, as indicated in FIG. 4, and the quit routine mode is called, as indicated by block 368, and parameters are passed indicating which system is to be deactivated. Referring to FIG. 7, the quit mode is shown in detail. First, controller 14 sends signals to the host equipment of the system to be deactivated causing the connected host equipment to be disabled as indicated by block 370. After disabling the host equipment, controller 14 communicates closing signals to all inlet and outlet valves of the system to be deactivated, causing all the inlet and outlet valves to be closed as indicated by block 372. After closing all the inlet and outlet valves the pointer registers, each register containing data representative of one system, are incremented for the next dispense system, as indicated by block 374 and the quit subroutine returns to the main program.

Referring to FIG. 14-34, the continuously active keyboard interrupt routine along with its individual sub-routines are shown. When one of the keyboard keys is depressed by the operator to select a mode of operation, enter parameters to control the operation of the system or other reason, the keyboard interrupt is called to read the depressed key and pass its value to controller 14 for use in controlling the operation of the system. Depending on the language that the algorhythms are coded in, the input algorhythms of FIGS. 14-34 may not be necessary.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. A dispense system for dispensing measured quantities of liquids through a dispense valve mechanism comprising:
   a valve dispensing mechanism through which liquid is dispensed and by which the quantity of liquid is measured by a length of time the valve dispensing mechanism is opened;
   reservoir means for holding the liquid to be dispensed, the reservoir means including an outlet coupled to the valve dispensing mechanism for flowing liquid under pressure for measured delivery by the valve dispensing mechanism, reservoir means further including an inlet for receiving replenishing liquid from a liquid supply;
   pressure sensing means in communication with the liquid at the outlet of the reservoir means for sensing a pressure of the liquid at the outlet;
   a controller responsive to a pressure signal from the pressure sensing means indicating the pressure of the liquid at the outlet and communicating a signal to the fluid pressure means causing the fluid pressure means to apply pressure to the liquid in a manner that substantially maintains a predetermined pressure at the outlet of the reservoir means during dispensing operations; and
   wherein said fluid pressure means is activated by a first signal for applying pressure from the pressure sensing means and wherein said fluid pressure means is deactivated by a second signal from said controller, and wherein said system further comprises:
   a plurality of inlets to said reservoir means, each inlet being connected to a liquid supply for resupplying liquid to said reservoir means; and
   inlet valve means included with each inlet for opening and closing each inlet separately so that each inlet can be individually selected in order to select a specific liquid supply, each inlet valve means being separately controlled by said controller and movable to an open position responsive to an opening signal from said controller, and to a closed position responsive to a closing signal from said controller, said controller communicating said opening signal to a selected inlet valve means when said fluid pressure means is deactivated to fill said reservoir with the amount of liquid.

2. The dispense system of claim 1, wherein said system further comprises liquid level sensor means adjacent said reservoir means for sensing a liquid level in said reservoir means, said controller being adapted to receive a first liquid level signal from said sensor means when said liquid level sensor means senses a low liquid level in said reservoir means and for communicating said opening signal to a selected inlet valve means responsive to said first liquid level signal for causing said selected valve means to move to its open position and communicate the selected liquid supply to said reservoir means when said fluid pressure means is deactivated.

3. The dispense system of claim 2, wherein said fluid pressure means is further selectively located adjacent each liquid supply for supplying pressure when required to act on the selected liquid supply, said controller for communicating a filling signal to said fluid pressure means responsive to said first liquid level signal when said fluid pressure means is deactivated for causing said fluid pressure means to selectively supply pressure that acts on the selected liquid supply and cause the liquid to flow from the selected liquid supply through the selected inlet into said reservoir means.

4. The dispense system of claim 2, wherein said system further includes vacuum means controlled by said controller and connected to said reservoir means, said controller communicating a filling signal to said vacuum means responsive to said first liquid level signal when said fluid pressure means is deactivated for causing said vacuum means to apply a suction to said reservoir means to draw liquid from the selected liquid supply through the selected inlet and into said reservoir means.

5. The dispense system of claim 2, wherein said controller is further adapted to receive a second liquid level signal from said sensor means when said sensor means senses a high liquid level in said reservoir means, said controller communicating a second filled signal to the selected inlet valve means responsive to said second liquid level signal for causing the selected inlet valve means to move to said closed position blocking further communication between the selected liquid supply and said reservoir means.

6. The dispense system of claim 4, wherein said system further includes exhaust interlock means between said reservoir means and said vacuum means, and wherein said interlock means includes a liquid overflow sensing means connected to said controller, said liquid overflow sensing means communicating an overflow signal to said controller when said liquid overflow sensing means detects liquid adjacent said exhaust interlock means.

7. A dispense system for dispensing measured quantities of liquids through a dispense valve mechanism comprising:
- a valve dispensing mechanism through which liquid is dispensed and by which the quantity of liquid is measured by a length of time the valve dispensing mechanism is opened;
- reservoir means for holding the liquid to be dispensed, the reservoir means including an outlet coupled to the valve dispensing mechanism for flowing liquid under pressure for measured delivery by the valve dispensing mechanism, reservoir means further including an inlet for receiving replenishing liquid from a liquid supply;
- pressure sensing means in communication with the liquid at the outlet of the reservoir means for sensing a pressure of the liquid at the outlet; and
- a controller responsive to a pressure signal from the pressure sensing means indicating the pressure of the liquid at the outlet and communicating a signal to the fluid pressure means causing the fluid pressure means to apply pressure to the liquid in a manner that substantially maintains a predetermined pressure at the outlet of the reservoir means during dispensing operations;
- filter means between said reservoir means and said outlet;
- warning means controlled by said controller; and
- means for sensing a pressure drop across said filter and producing at least one filter signal indicative of the pressure drop across said filter when said fluid pressure means is activated responsive to said demand signal and liquid is dispensed from said reservoir means through said outlet, said controller receiving said filter signal and converting said filter signal to a usable value representative of the pressure drop, said controller for comparing the value representative of the pressure drop to a predetermined value and communicating a warning activation signal to said warning means when said value representative of the pressure drop exceeds the predetermined value for activating said warning means.

8. The system of claim 7, wherein said warning means is visual.

9. The system of claim 3, wherein said warning means is audible.

10. A system for dispensing liquid, comprising:
reservoir means containing an amount of liquid;
control processor means adapted to receive a demand signal signifying a requirement for at least a portion of said liquid;
fluid pressure means controlled by said processor means and connected to said reservoir means, said fluid pressure means being activated by a first signal from said processor means when said demand signal is received by said processor means for applying pressure to said reservoir means to act against the liquid in said reservoir means and cause a specific amount of liquid to be dispensed, said processor means for communicating a second signal to said fluid pressure means when the specific amount of liquid is dispensed to deactivate said fluid pressure means;
outlet means controlled by said processor means and connected to said reservoir means through which the specific amount of liquid passes when said fluid pressure means is activated;
sensor means adjacent said reservoir means for sensing a low liquid level in said reservoir means and communicating a low liquid level signal to said processor means when the low liquid level is sensed; and
inlet means to said reservoir means connected to a liquid supply and controlled by said processor means, said processor means for communicating an opening signal to open said inlet means when said processor means receives said low liquid level signal and said fluid pressure means is deactivated.

11. The dispense system of claim 10, wherein said system further includes vacuum means controlled by said processor means and connected to said reservoir means, said processor means for communicating a filling signal to said vacuum means responsive to said first liquid level signal when said processor means receives said low liquid level signal and said fluid pressure means is deactivated to cause said vacuum means to apply a suction to said reservoir means to draw liquid from the liquid supply through said inlet means into said reservoir means.

12. The dispense system of claim 10, wherein said system further comprises fluid pressure means connected to the liquid supply and controlled by said processor means, said processor means communicating a filling signal to said fluid pressure means responsive to said first liquid level signal when said processor means receives said low liquid level signal and said fluid pressure means is deactivated to cause said fluid pressure means to apply pressure against the liquid supply to force liquid from the liquid supply through said inlet means into said reservoir means.

13. The dispense system of claim 10, wherein said processor means is a microprocessor.

14. A system for dispensing liquid, comprising:
reservoir means containing an amount of liquid;
control processor means adapted to receive a demand signal signifying a requirement for at least a portion of the liquid;
fluid pressure means controlled by said processor means and connected to said reservoir means, said fluid pressure means being activated by a first signal from said processor means when said demand signal is received by said processor for applying pressure to said reservoir means to act against the liquid in said reservoir means and cause a specific amount of liquid to be dispensed, said processor means for communicating a second signal to said fluid pressure means when the specific amount of liquid is dispensed to deactivate said fluid pressure means;

at least one outlet means controlled by said processor means and individually connected to said reservoir means, said processor means for opening a selected one of said outlet means through which the specific amount of liquid passes when said fluid pressure means applies pressure acting against the liquid and closing off said selected one of said outlet valve means when the specific amount of liquid has passed through said selected outlet means;

sensor means adjacent said reservoir means for sensing a low liquid level in said reservoir means, said processor means being adapted to receive a low liquid level signal from said sensor means when said sensor means senses a low liquid level in said reservoir means; and at least one inlet means to said reservoir means, each inlet means being connected to a separate liquid supply and individually controlled by said processor means, said processor means for communicating a signal to open a selected one of said inlet means when said processor means receives said low liquid level signal and said fluid pressure means is deactivated.

15. The system of claim 14, wherein said system further includes vacuum means controlled by said processor means and connected to said reservoir means, said processor means for communicating a filling signal to said vacuum means responsive to said first liquid level signal when said processor means receives said low liquid level signal and said fluid pressure means is deactivated to cause said vacuum means to apply a suction to said reservoir means to draw liquid from the liquid supply connected to said selected one of said inlet means through said selected inlet means into said reservoir means.

16. The system of claim 14, wherein said fluid pressure means is further connected adjacent each liquid supply and controlled by said processor means, said processor means communicating a filling signal to said fluid pressure means responsive to said first liquid level signal when said processor means receives said low liquid level signal and said fluid pressure means is deactivated to cause said fluid pressure means to apply pressure against the liquid supply present at said selected one of said inlet means to force liquid from the liquid supply through said selected one of said inlet means into said reservoir means.

17. The system of claim 14, wherein said processor means is a microprocessor.

18. A dispensing system for dispensing liquid, comprising:

reservoir means containing an amount of liquid;

control processor means adapted to receive a demand signal signifying a requirement for at least a portion of said liquid;

fluid pressure means controlled by said processor means and connected to said reservoir means, said fluid pressure means being activated by a first signal from said processor means when said demand signal is received by said processor means for applying pressure to said reservoir means to act against the liquid in said reservoir means and cause liquid to be dispensed;

outlet means controlled by said processor means and connected to said reservoir means through which the liquid passes when said pump means is activated;

filter means before said outlet means, said filter means for filtering the liquid passed through said outlet means; and evacuation means connected to said reservoir means and controlled by said processor means, said evacuation means being activated by an evacuation signal from said processor means when said fluid pressure means is deactivated, said evacuation means for removing the pressure acting on the liquid in said reservoir means.

19. The dispensing system of claim 18, wherein said system further includes pressure sensing means for sensing the pressure of the liquid adjacent said outlet means and before said filter means, said pressure sensing means being connected to said processor means for communicating at least one pressure signal to said processor means indicative of a pressure drop across said filter means when liquid is passed through said outlet means, said processor means for receiving said pressure signal and converting said pressure signal to a usable value representative of the pressure drop, said processor means for comparing said value representative of said pressure drop to a predetermined value, said system further including warning means activated by a warning signal from said controller means when said value representative of the pressure drop exceeds the predetermined value.

20. The dispensing system of claim 18, wherein said evacuation means comprises vacuum venturi means connected to said reservoir means and controlled by said processor means, said vacuum venturi means being activated by a venturi signal from said processor means for evacuating said reservoir means to a reduced pressure.

21. The dispensing system of claim 18, wherein said evacuation means comprises vacuum venturi means connected to said reservoir means and valve means between said venturi means and said reservoir means controlled by said processor means, said vacuum venturi means for venting said reservoir means to atmospheric pressure when said processor means communicates an opening signal to said valve means.

22. A dispensing system for dispensing liquid, comprising:

reservoir means containing an amount of liquid;

control processor means adapted to receive a demand signal signifying a requirement for at least a portion of said liquid;

pump means controlled by said processor means and connected to said reservoir means, said pump means being activated by a first signal from said processor means when said demand signal is received by said processor means for causing an amount of liquid to be dispensed;

outlet means controlled by said processor means and connected to said reservoir means through which the liquid passes when said pump means is activated;

filter means before said outlet means, said filter means for filtering the liquid passed through said outlet means; and pressure sensing means adjacent said outlet means for sensing the pressure of the liquid adjacent said outlet means and before said filter means, said pressure sensor means being connected to said processor means for communicating at least one pressure signal to said processor means indicative of a pressure drop across said filter means when liquid is passed through said outlet means, said processor means for receiving said pressure signal and converting said pressure signal to a usable value representative of the pressure drop, said processor means for comparing said value representative of said pressure drop to a predetermined value.

23. The dispensing system of claim 22, wherein said pump means comprises fluid pressure means controlled by said processor means and connected to said reservoir means, said fluid pressure means being activated by said first signal from said processor means when said demand signal is received by said processor means for applying pressure to said reservoir means to act against the liquid in said reservoir means and cause liquid to be dispensed.

24. A dispensing system for dispensing liquid, comprising:
reservoir means containing an amount of liquid;
control processor means adapted to receive a demand signal signifying a requirement for at least a portion of said liquid;
pump means controlled by said processor means and connected to said reservoir means, said pump means being activated by a first signal from said processor means when said demand signal is received by said processor means for causing an amount of liquid to be dispensed;
outlet means controlled by said processor means and connected to said reservoir means through which the liquid passes when said pump means is activated;
filter means before said outlet means, said filter means for filtering the liquid passed through said outlet means;
pressure sensing means adjacent said outlet means for sensing the pressure of the liquid adjacent said outlet means and before said filter means, said pressure sensor means being connected to said processor means for communicating at least one pressure signal to said processor means indicative of a pressure drop across said filter means when liquid is passed through said outlet means, said processor means for receiving said pressure signal and converting said pressure signal to a usable value representative of the pressure drop, said processor means for comparing said value representative of said pressure drop to a predetermined value; and
filter warning means controlled by said processor means, said filter warning means being activated by a signal from said processor means when said value representative of the pressure drop exceeds the predetermined value.

25. The dispensing system of claim 24, wherein said pump means comprises fluid pressure means controlled by said processor means and connected to said reservoir means, said fluid pressure means being activated by said first signal from said processor means when said demand signal is received by said processor means for applying pressure to said reservoir means to act against the liquid in said reservoir means and cause liquid to be dispensed.

26. The dispensing system of claim 24, wherein said filter warning means comprises audible warning means.

27. The dispensing system of claim 24, wherein said filter warning means comprises visual warning means.

28. A dispensing system for dispensing liquid, comprising:
reservoir means containing an amount of liquid;
control processor means adapted to receive a demand signal signifying a requirement for at least a portion of said liquid;
fluid pressure means controlled by said processor means and connected to said reservoir means, said fluid pressure means being activated by a first signal from said processor means when said demand signal is received by said processor means for applying pressure to said reservoir means to act against the liquid in said reservoir means and cause liquid to be dispensed, said processor means for communicating a second signal to said fluid pressure means to deactivate said fluid pressure means when the liquid has been dispensed;
outlet means controlled by said processor means and connected to said reservoir means through which the liquid passes when said pump means is activated; and
evacuation means connected to said reservoir means and controlled by said processor means, said evacuation means being activated by an evacuation signal from said processor means when said fluid pressure means is deactivated, said evacuation means for removing the pressure acting on the liquid in said reservoir means.

29. The dispensing system of claim 28, wherein said evacuation means comprises vacuum venturi means connected to said reservoir means and controlled by said processor means, said vacuum venturi means being activated by a venturi signal from said processor means for evacuating said reservoir means to a reduced pressure.

30. The dispensing system of claim 28, wherein said evacuation means comprises vacuum venturi means connected to said reservoir means and valve means between said venturi means and said reservoir means controlled by said processor means, said vacuum venturi means for venting said reservoir means to atmospheric pressure when said processor means communicates an opening signal to said valve means.

31. A dispensing system for dispensing liquid comprising:
processor means;
reservoir means for containing an amount of liquid;
means for sensing a high liquid level in said reservoir means and for communicating a high liquid level signal to said processor means when said high liquid level is reached;
exhaust interlock means connected to said reservoir means above said high liquid level, said exhaust interlock means for sensing liquid overflow above said high liquid level, said exhaust interlock means communicating an overflow signal to said processor means when liquid overflow is detected above said high liquid level; and
means connected to said reservoir means for dispensing liquid from said reservoir means and for refilling said reservoir means, said means for dispensing and refilling being controlled by said processor means, said processor means communicating a deactivation signal to said means for dispensing and refilling to deactivate said means for dispensing and refilling when said overflow signal is received by said processor means.

32. The dispensing system of claim 31, wherein said processor means is a microprocessor.

33. The dispensing system of claim 31, wherein said means for dispensing and refilling includes pump means controlled by said processor means and connected to said reservoir means, said pump means being activated by a first activation signal from said processor means when a demand signal is received by said processor means for causing an amount of liquid to be dispensed; and outlet means controlled by said processor means and connected to said reservoir means through which the liquid passes when said pump means is activated.

34. The dispensing system of claim 33, wherein said pump means comprises fluid pressure means controlled by said processor means and connected to said reservoir means, said fluid pressure means being activated by said first activation signal from said processor means when said demand signal is received by said processor means for applying pressure to said reservoir means to act against the liquid in said reservoir means and cause liquid to be dispensed.

35. The dispensing system of claim 31 wherein said means for dispensing and refilling includes inlet means to said reservoir means, said inlet means being connected to a liquid supply for refilling said reservoir means.

36. The dispensing system of claim 31, wherein said exhaust interlock means comprises chamber means connected to said reservoir means above said high liquid level, and liquid overflow sensing means adjacent said chamber means connected to said processor means, said liquid overflow sensing means communicating said overflow signal to said processor means when liquid overflow is detected in said chamber means.

37. The dispensing system of claim 36, wherein said liquid overflow sensing means is a capacitive sensor.

38. A dispensing system for dispensing liquid, comprising:
processor means;
reservoir means containing an amount of liquid;
means controlled by said processor means for replenishing said amount of liquid in said reservoir means, said means for replenishing being connected to said reservoir means; and
means controlled by said processor means for dispensing an amount of liquid from said reservoir means, said means for dispensing being connected to said reservoir means, said processor means for deactivating said means for replenishing when said means for dispensing is activated by said processor means.

39. The dispensing system of claim 38, wherein said means for dispensing includes pump means controlled by said processor means and connected to said reservoir means, said pump means being activated by a signal from said processor means when a demand signal is received by said processor means for causing liquid to be dispensed, said means for dispensing further including outlet means connected to said reservoir means controlled by said processor means, said outlet means being opened by an opening signal from said processor means when said demand signal is received by said processor means.

40. The dispensing system of claim 38, wherein said means for dispensing includes fluid pressure means controlled by said processor means and connected to said reservoir means, said fluid processor means being activated by a signal from said processor means when a demand signal is received by said processor means for applying pressure to said reservoir means to act against the liquid in said reservoir means and cause liquid to be dispensed, said means for dispensing further including outlet means connected to said reservoir means controlled by said processor means, said outlet means being opened by an opening signal from said processor means when said demand signal is received by said processor means.

41. The dispensing system of claim 38, wherein said means for replenishing includes inlet means connected to said reservoir means controlled by said processor means, said inlet means being further connected to a liquid supply for replenishing said reservoir means, said means for dispensing further including vacuum venturi means connected to said reservoir means controlled by said processor means, said inlet means being opened by an opening signal from said processor means and said vacuum venturi means being activated by a refill signal from said processor means when said means for dispensing is deactivated, said vacuum venturi means when activated for causing a reduced pressure in said reservoir means to draw the amount of liquid from the liquid supply through said inlet means into said reservoir means.

42. The dispensing system of claim 38, wherein said means for replenishing includes inlet means connected to said reservoir means controlled by said processor means, said inlet means being further connected to a liquid supply for replenishing said reservoir means, said means for dispensing further including fluid pressure means connected to the liquid supply, said inlet means being opened by an opening signal from said processor means and said fluid pressure means being activated by a refill signal from said processor means when said means for dispensing is deactivated, said fluid pressure means when activated for applying pressure against the liquid in the liquid supply to force the amount of liquid from the liquid supply through said inlet means into said reservoir means.

43. The dispensing system of claim 38, wherein said means for replenishing includes inlet means connected to said reservoir means and controlled by said processor means, said inlet means being further connected to a pre-pressurized liquid supply for replenishing said reservoir means, said inlet means being opened by an opening signal from said processor means and the pressure within the pre-pressurized liquid supply acting against the liquid in the liquid supply to force the amount of liquid from the liquid supply through said inlet means into said reservoir means.

44. The dispensing system of claim 38, wherein said processor means is a microprocessor.

45. A dispensing system for dispensing a quantity of liquid, comprising:
reservoir means containing an amount of liquid;
control processor means adapted to receive a demand signal signifying a requirement for a specified amount of the liquid;
fluid pressure means controlled by said processor means and connected to said reservoir means for applying pressure when required to said reservoir means to act against the liquid, said processor means communicating a signal to said fluid pressure means in response to said demand signal for causing said fluid pressure means to apply pressure acting against the liquid;

outlet means connected to said reservoir means through which the portion of liquid passes when said fluid pressure means applies pressure acting against the liquid; and pressure sensing means adjacent said outlet connected to said processor means, said pressure sensing means communicating a pressure signal to said processor means indicative of the pressure adjacent said outlet means, said processor means for converting said pressure signal to a usable value and comparing said value to a predetermined pressure value, said processor means for controlling the pressure applied by said fluid pressure means until said value converted from said pressure signal indicates within a predetermined tolerance the pressure adjacent said outlet means approximates said predetermined pressure value.

46. The dispensing system of claim 45, wherein said system further includes filter means between said reservoir means and said pressure sensing means.

47. The dispensing system of claim 45, wherein said processor means is a microprocessor.

48. A dispensing system for dispensing a quantity of liquid, comprising:

reservoir means containing an amount of liquid;

control processor means adapted to receive a demand signal signifying a requirement for a specified amount of the liquid;

fluid pressure means controlled by said processor means and connected to said reservoir means for applying pressure when required to said reservoir means to act against the liquid, said processor means communicating a signal to said fluid pressure means in response to said demand signal for causing said fluid pressure means to apply pressure acting against the liquid;

outlet means controlled by said processor means and connected to said reservoir means through which the portion of liquid passes when said fluid pressure means applies pressure acting against the liquid; and means for dispensing the specified amount of liquid through said outlet means controlled by said processor means, said means for dispensing being located adjacent said outlet means, said means for dispensing the specified amount of liquid including pressure sensing means adjacent said outlet means connected to said processor means, orifice means adjacent said outlet means through which the liquid passes, and timing means included with said processor means and connected to said outlet means for closing said outlet means at the end of a predetermined time interval, said pressure sensing means communicating a pressure signal to said processor means indicative of the pressure adjacent said outlet means, said processor means for converting said pressure signal to a usable value and comparing said value to a predetermined pressure value, said processor means for controlling the pressure applied by said fluid pressure means until said value converted from said pressure signal indicates within a predetermined tolerance the pressure adjacent said outlet means approximates said predetermined pressure value, said processor means for communicating an opening signal to said outlet means when said value converted from said pressure signal indicates within the predetermined tolerance that the pressure sensed adjacent said outlet means approximates the predetermined pressure value.

49. The dispensing system of claim 48, wherein said system further includes filter means between said reservoir means and said pressure sensing means.

50. The dispensing system of claim 48, wherein said processor means is a microprocessor.

51. A dispensing system for dispensing a quantity of liquid, comprising:

reservoir means containing an amount of liquid;

control processor means adapted to receive a demand signal signifying a requirement for at least a portion of said liquid;

fluid pressure means controlled by said processor means and connected to said reservoir means for applying pressure when required to said reservoir means to act against said liquid, said processor means communicating a signal to said fluid pressure means in response to said demand signal for causing said fluid pressure means to apply pressure acting against said liquid;

a plurality of outlet means connected to said reservoir, said demand signal signifying a particular one of said outlet means through which said portion of liquid passes when said fluid pressure means applies pressure acting against said liquid;

liquid level sensor means adjacent said reservoir means for sensing a low liquid level in said reservoir means and communicating a low liquid level signal to said control processor means when said low liquid level is sensed; and a plurality of inlet means to said reservoir means, each inlet means being connected to an individual liquid supply and separately controlled by said processor means, said processor means for communicating an opening signal for opening a selected one of said inlet means when said processor means receives said low liquid level signal and said fluid pressure means is deactivated.

52. A method of dispensing liquid in measured quantities comprising the steps of:

filling a reservoir with liquid to be dispensed from the reservoir through an outlet in communication with a dispense means that opens for a preselected period of time to deliver liquid under known pressure to deliver a measured quantity of liquid;

applying pressure to liquid in the reservoir when demanded for dispensing;

monitoring a pressure of the liquid at the outlet of the reservoir;

adjusting the pressure applied to the liquid during demand dispensing to maintain a preselected liquid pressure at the outlet of the reservoir within preselected tolerances; and reducing the pressure applied to the liquid in the reservoir when dispensing is halted to less than atmospheric pressure.

53. The method of claim 52, wherein the step of reducing the pressure includes reducing the pressure applied to the reservoir to atmospheric pressure.

54. A method of dispensing liquid from a reservoir, comprising the steps of:

receiving a demand signal signifying a requirement for at least a portion of the liquid contained in the reservoir in a microprocessor;

dispensing liquid contained in the reservoir in response to a dispense signal generated by the microprocessor when the demand signal is received in the microprocessor;

filtering the liquid from the reservoir while dispensing with a filtering means;

communicating at least one signal representative of a pressure drop across the filtering means to the microprocessor; and converting the signal representative of the pressure drop to a usable value representative of the pressure drop within the microprocessor, and comparing the value to a predetermined value for the pressure drop.

55. The method of claim 54, wherein the step of dispensing includes the step of applying pressure to the liquid contained in the reservoir in response to the dispense signal generated by the microprocessor when the demand signal is received in the microprocessor.

56. The method of claim 54, wherein the method further comprises the step of activating a warning means when the value representative of the pressure drop exceeds the predetermined value.

57. A method of dispensing liquid from a reservoir, comprising the steps of:

receiving a demand signal signifying a requirement for at least a portion of the liquid contained in the reservoir in a microprocessor;

applying pressure to the liquid contained in the reservoir in response to a dispense signal generated by the microprocessor when the demand signal is received in the microprocessor;

dispensing liquid from the reservoir by the pressure applied to the liquid contained in the reservoir;

receiving a pressure signal representative of a pressure sensed adjacent an outlet through which the liquid passes before the step of dispensing in the microprocessor;

comparing a value representative of the pressure sensed with a predetermined pressure value in the microprocessor; and communicating an opening signal to open the outlet for dispensing liquid when the value representative of the pressure sensed is within a predetermined tolerance of the predetermined pressure value.

58. The method of claim 57, wherein the step of dispensing further comprises the steps of:

continually receiving the pressure signal during the step of dispensing in the microprocessor;

continually comparing the value representative of the pressure sensed with the predetermined value in the microprocessor during the step of dispensing; and continually altering the pressure applied to the reservoir to retain the value representative of the pressure sensed during the dispensing step within the predetermined tolerance.

59. The method of claim 58, wherein the step of dispensing further comprises the step of passing the liquid, as the liquid is dispensed, through an orifice means to provide a preselected rate of flow.

60. The method of claim 59, wherein the step of dispensing further comprises the step of halting the dispensing step at the end of a preselected time interval in order to dispense a specific amount of liquid.

61. The method of claim 57, wherein the method further includes the step of filtering the liquid while dispensing.

62. A method of dispensing a quantity of liquid, comprising the steps of:

receiving a demand signal in a microprocessor;

dispensing a specific amount of liquid from a reservoir in response to a dispense signal generated by the microprocessor when the demand signal is received in the microprocessor;

receiving a low liquid level signal in the microprocessor when the liquid level is below a predetermined low liquid level for the reservoir;

continuing to dispense a specific amount of liquid from the reservoir responsive to the demand signal when the low liquid level signal is received in the microprocessor;

increasing an accumulator by one for a dispense occurring after the low liquid level signal is received in the microprocessor;

comparing the accumulator to a predetermined empty count for the reservoir;

halting the step of dispensing when the accumulator exceeds the predetermined empty count for the reservoir; and refilling the reservoir in response to a filling signal generated by the microprocessor when the low liquid level signal is received in the microprocessor and liquid is not being dispensed from the reservoir.

63. A dispense system for dispensing measured quantities of liquids comprising:

a valve dispensing mechanism through which liquid is dispensed and by which the quantity of liquid is measured by a length of time the valve dispensing mechanism is opened;

reservoir means for holding liquid to be dispensed, the reservoir means including an outlet coupled to the valve dispensing mechanism for flowing liquid under pressure for measured delivery by the valve dispensing mechanism and an inlet for receiving replenishing liquid from a liquid supply;

fluid pressure means for applying pressure to liquid in the reservoir during;

a filter between the reservoir means and the valve dispensing mechanism for filtering the liquid;

pressure sensing means in communication with the liquid after passing through the filter;

a controller responsive to the pressure sensing means and communicating with the fluid pressure means causing the fluid pressure means to apply pressure to the liquid in a manner that substantially maintains a predetermined pressure at the outlet of the reservoir means during dispensing operations to thereby compensate in part for variable pressure drops across the filter.

64. The dispense system of claim 63 wherein said dispensing valve mechanism comprises outlet valve means, each outlet valve means being individually controlled by said controller and movable by an opening signal from said controller to an open position to dispense liquid, and a second closing signal to a closed position blocking fluid passage through the selected outlet.

65. The system of claim 63, wherein said pressure sensing means is connected to said reservoir means adjacent said outlet for sensing the pressure of the liquid adjacent said outlet, said controller for comparing a value representative of the pressure signal to the preselected value for the pressure and communicating with said fluid pressure means when the compared values exceed a predetermined tolerance to alter the pressure adjacent said outlet to correspond to a preselected pressure.

66. The system of claim 65, wherein said system further comprises means between said reservoir and said outlet for providing a selected rate of flow of liquid at the preselected pressure.

67. The system of claim 66, wherein said means for providing a selected rate of flow of liquid is an orifice.

68. The system of claim 63, wherein said controller is a microprocessor.

69. A method of dispensing liquid in measured quantities comprising the steps of:
   filling a reservoir with liquid to be dispensed from the reservoir through an outlet in communication with a dispense means that opens for a preselected period of time to deliver liquid under known pressure to deliver a measured quantity of liquid;
   applying pressure to liquid in the reservoir when demanded for dispensing;
   filtering with a filter the liquid at the outlet as it flows from the reservoir;
   monitoring a pressure of the liquid at the outlet of the reservoir on a downstream side of the filter;
   adjusting the pressure applied to the liquid during demand dispensing to maintain a preselected liquid pressure at the outlet of the reservoir within preselected tolerances.

70. The method of claim 69, wherein the method further comprises the steps of:
   sending to a microprocessor a low liquid level signal signifying a low liquid level in the reservoir;
   receiving the low liquid level signal in the microprocessor; and
   opening an inlet connected to the reservoir responsive to a refill signal generated by the microprocessor when the low liquid level signal is received by the microprocessor and the step of dispensing liquid is not active, and refilling the reservoir with liquid from a liquid supply present at the inlet when the inlet is opened.

71. The method of claim 70, wherein the step of opening an inlet and refilling the reservoir includes the steps of:
   reducing the pressure of the reservoir in response to a second refill signal generated by the microprocessor when the low liquid level signal is received by the microprocessor and liquid is not being dispensed from the reservoir; and
   drawing an amount of liquid contained in the liquid supply through the opened inlet into the reservoir by the action of the reduced pressure of the reservoir.

72. The method of claim 70, wherein the step of opening an inlet and refilling the reservoir includes the steps of:
   applying pressure to the liquid contained in the liquid supply in response to a second refill signal generated by the microprocessor when the low liquid level signal is received by the microprocessor and liquid is not being dispensed from the reservoir; and
   forcing an amount of liquid contained in the liquid supply through the opened inlet into the reservoir by the pressure applied to the liquid contained in the liquid supply.

73. The method of claim 70, wherein the method further comprises the steps of:
   sending a high liquid level signal signifying a high liquid level in the reservoir;
   receiving the high liquid level signal in the microprocessor; and
   closing the inlet responsive to a filled signal generated by the microprocessor when the high liquid level signal is received by the microprocessor, and halting further flow of liquid from the liquid supply when the inlet is closed.

74. The method of claim 73, wherein the method further comprises the steps of:
   monitoring the reservoir for a presence of liquid above the high liquid level;
   halting further steps of dispensing and filling when the presence of liquid is detected above the high liquid level; and
   reducing the pressure of the reservoir when the presence of liquid is detected above the high liquid level.

75. The method of claim 74, wherein the step of reducing the pressure of the reservoir includes reducing the pressure of the reservoir to atmospheric pressure.

76. The method of claim 69, wherein the method further comprises the step of sensing a pressure drop across the filter during the step of dispensing liquid.

77. The method of claim 76, wherein the method further comprises the step of activating a warning means when the pressure drop exceeds a predetermined value.

78. The method of claim 69, wherein the method further comprises the steps of:
   filtering the liquid with said filter which is disposed between the reservoir and an outlet through which the liquid is dispensed during the step of dispensing liquid;
   sensing a pressure drop across said filter during the step of dispensing liquid; and
   activating a warning means when the pressure drop exceeds a predetermined value.

79. The method of claim 69 further comprising the step of reducing the pressure on the liquid when it is no longer demanded for dispensing.

80. The method of claim 79 further comprising the step of replenishing the reservoir through an inlet with liquid from a liquid supply source when the pressure is removed.

81. The method of claim 69 wherein there are a plurality of dispense means coupled to the outlet of the reservoir, and wherein the method further includes the step of operating two of the dispense means during dispensing.

82. In a dispense system having a reservoir, a source of pressurizing gas to be delivered to the reservoir under control of a controller for applying pressure to liquid in the reservoir, an outlet in the reservoir in communication with a dispense means that opens for a predetermined period of time to measure out a desired quantity of liquid, a controller process including a fill cycle during which the reservoir is replenished with liquid, an idle cycle, and a dispense cycle during which liquid is dispensed; wherein,
   the dispense cycle includes the steps of application of a pressurizing gas to the liquid in the reservoir in response to a demand for dispensing, monitoring the pressure of the liquid at the outlet, and adjusting the pressure of the gas on the liquid to maintain the pressure of the liquid at the outlet to within predetermined tolerances;

the fill cycle includes the step of causing refilling the reservoir with liquid from a replenishing source when there is an indication for refilling; and the idle cycle includes the step of reducing the pressure of the gas on the liquid to below a predetermined pressure level when there is an absence of demand for dispensing, the predetermined pressure level being one that substantially reduces possibility of entrainment of pressurizing gas in the liquid that decreases accuracy of measurement of amounts of liquid dispensed, and the step of waiting for receipt of an indication for a demand for dispensing to reapply pressure to the liquid in the reservoir.

83. The process of claim 82 wherein the step of adjusting the pressure of the gas on the liquid includes the step of submitting to the controller an indication of pressure of the liquid at the outlet from a pressure sensor and the step of controlling the source of pressurizing gas to maintain the pressure of the liquid at the outlet to within predetermined tolerances in response to the indication.

84. The process of claim 82 wherein the fill cycle takes place only when there is no demand for dispensing and includes the step of creating a vacuum pressure within the reservoir to draw liquid from a liquid supply source into the reservoir.

85. The process of claim 84 wherein the dispense system includes a plurality of liquid supply sources, each supply source coupled to the reservoir for fluid communication through one of a plurality of valves; and wherein the fill cycle includes the step of causing opening one of a plurality of valves from which to draw liquid into the reservoir for replenishing.

86. The process of claim 82 wherein the dispense system further includes a dispense means in fluid communication with the outlet of the reservoir; and wherein the dispense cycle further includes the step of allowing opening of the dispense means to dispense liquid only when the pressure of the liquid at the outlet is within the preselected tolerances.

87. The process of claim 86 wherein the idle cycle further includes steps of disabling the dispense means to dispense when reducing the pressure on the liquid; and further includes the step of waiting for receipt of a demand for dispensing to reapply pressurized gas to the liquid in the reservoir.

88. The process of claim 82 wherein the step of reducing the pressure of the gas on the liquid during the idle cycle is initiated after a demand for dispensing ceases and in the absence of an indication for refilling of the reservoir.

89. The process of claim 82 wherein the step of reducing pressure to below a predetermined pressure during the idle cycle includes the step of reducing the pressure to atmospheric pressure.

90. The process of claim 82 wherein the step of reducing pressure to below a predetermined pressure level during the idle cycle includes the step of reducing the pressure of the gas to below atmospheric pressure.

* * * * *